US012802617B2

(12) United States Patent
Zhang

(10) Patent No.: US 12,802,617 B2
(45) Date of Patent: Nov. 17, 2026

(54) DISPLAY DEVICE AND DRIVING METHOD THEREOF

(71) Applicants: Wuhan Tianma Micro-Electronics Co., Ltd., Wuhan (CN); Wuhan Tianma Micro-Electronics Co., Ltd. Shanghai Branch, Shanghai (CN)

(72) Inventor: Mengmeng Zhang, Wuhan (CN)

(73) Assignees: Wuhan Tianma Micro-Electronics Co., Ltd., Wuhan (CN); Wuhan Tianma Micro-Electronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/774,421

(22) Filed: Jul. 16, 2024

(65) Prior Publication Data

US 2025/0191523 A1 Jun. 12, 2025

(30) Foreign Application Priority Data

Dec. 11, 2023 (CN) ......................... 202311707873.1

(51) Int. Cl.
*G09G 3/32* (2016.01)
*G09G 3/3208* (2016.01)
(Continued)

(52) U.S. Cl.
CPC ............. *G09G 3/32* (2013.01); *G09G 3/3208* (2013.01); *G09G 3/3233* (2013.01); (Continued)

(58) Field of Classification Search
CPC ...... G09G 3/32; G09G 3/3208; G09G 3/3233; G09G 3/3266; G09G 2300/0426; G09G 2310/08; G09G 2320/0247
(Continued)

(56) References Cited

U.S. PATENT DOCUMENTS 11,538,402 B2 * 12/2022 Yuan ........................ G09G 3/32
11,875,717 B2 * 1/2024 Zhang ...................... G09G 3/20
(Continued)

FOREIGN PATENT DOCUMENTS

CN 114913801 A * 8/2022 ........... G09G 3/2074
WO 2023272589 A1 1/2023

OTHER PUBLICATIONS

English Language Translation of CN-114913801A (Year: 2022).*

*Primary Examiner* — Jason M Mandeville
(74) *Attorney, Agent, or Firm* — Anova Law Group, PLLC

(57) ABSTRACT

A display device and its driving method are provided. The display device includes a display panel. The display panel includes pixel circuits arranged in multiple rows. Each pixel circuit includes a light-emitting control transistor and a driving transistor. The light-emitting control transistor is used to control a corresponding light-emitting element to enter a light-emitting stage; and the driving transistor is used to provide a driving current for the corresponding light-emitting element. A driving process of the display panel includes a first stage and a display stage. The first stage is located at least before or after the display stage. In the first stage, at least one of light-emitting control transistors and driving transistors in each row of pixel circuits is turned off. A duration of the first stage is t, and a data refresh frequency of the pixel circuits in the display stage is f, t≤1/f.

19 Claims, 17 Drawing Sheets

(51) Int. Cl.
*G09G 3/3233* (2016.01)
*G09G 3/3266* (2016.01)

(52) U.S. Cl.
CPC ... *G09G 3/3266* (2013.01); *G09G 2300/0426* (2013.01); *G09G 2310/08* (2013.01); *G09G 2320/0247* (2013.01)

(58) Field of Classification Search
USPC ........................................................... 345/55
See application file for complete search history.

(56) References Cited

U.S. PATENT DOCUMENTS

| | | | | |
|---|---|---|---|---|
| 11,922,866 | B1 * | 3/2024 | Sohn | G09G 3/32 |
| 12,190,805 | B2 * | 1/2025 | Zhang | G09G 3/3233 |
| 2019/0333596 | A1 * | 10/2019 | Zhu | G11C 19/287 |
| 2021/0104196 | A1 * | 4/2021 | Yuan | G09G 3/3258 |
| 2025/0140201 | A1 * | 5/2025 | Liu | G09G 3/3266 |

* cited by examiner

DISPLAY DEVICE AND DRIVING METHOD THEREOF

CROSS-REFERENCE TO RELATED APPLICATION

This application claims the priority of Chinese Patent Application No. 202311707873.1, filed on Dec. 11, 2023, the content of which is incorporated herein by reference in its entirety.

TECHNICAL FIELD

The present disclosure generally relates to the field of display technology and, more particularly, relates to a display device and its driving method.

BACKGROUND

With the continuous development of display technology, users have increasingly higher requirements for performance of display devices in all aspects.

Operation of a display device includes processes of powering on and off. Currently, the processes of powering on and off take a long time, affecting the users' experience.

SUMMARY

One aspect of the present disclosure provides a display device. The display device includes a display panel. The display panel includes pixel circuits arranged in multiple rows. Each pixel circuit includes a light-emitting control transistor and a driving transistor. The light-emitting control transistor is used to control a corresponding light-emitting element to enter a light-emitting stage; and the driving transistor is used to provide a driving current for the corresponding light-emitting element. A driving process of the display panel includes a first stage and a display stage. The first stage is located at least before or after the display stage. In the first stage, at least one of light-emitting control transistors and driving transistors in each row of pixel circuits is turned off. A duration of the first stage is t, and a data refresh frequency of the pixel circuits in the display stage is f, $t \leq 1/f$.

Another aspect of the present disclosure provides a driving method of a display device. The display device includes a display panel. The display panel includes pixel circuits arranged in multiple rows. Each pixel circuit includes a light-emitting control transistor for controlling a corresponding light-emitting element to enter a light-emitting stage and a driving transistor for providing a driving current to the corresponding light-emitting element. A driving process of the display panel including a first stage and a display stage, and the first stage is located at least before or after the display stage. The driving method includes: in the first stage, controlling at least one of light-emitting control transistors and driving transistors in each row of pixel circuits to be turned off. A duration of the first stage is t, and a data refresh frequency of the pixel circuit in the display stage is f, wherein $t \leq 1/f$.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
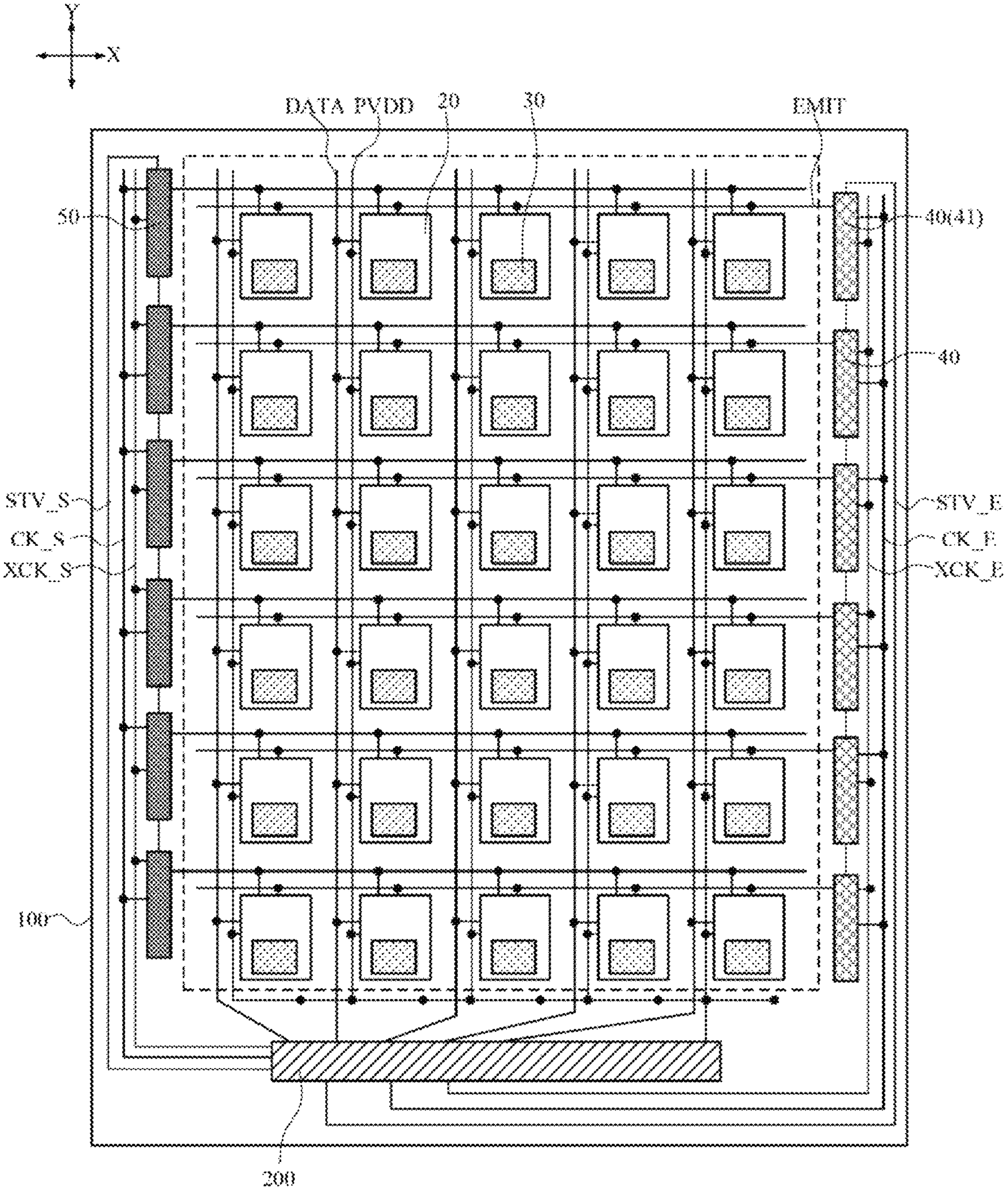
FIG. 1 illustrates a top view of an exemplary display device consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

In the present disclosure, relational terms such as first and second are only used to distinguish one entity or operation from another entity or operation, and do not necessarily require or imply any such actual relationship between these entities or operations or order. Moreover, the terms "including", "comprising" or any other variants thereof are intended to cover non-exclusive inclusion, such that a process, method, article, or device that includes a series of elements includes not only those elements, but also those that are not explicitly listed or also include elements inherent to this process, method, article or equipment. If there are no more restrictions, the elements defined by the sentence "including . . . " do not exclude the existence of other same elements in the process, method, article, or equipment that includes the elements.

It should be understood that when describing the structure of a component, when a layer or region is referred to as being "on" or "above" another layer or another region, the layer or region may be directly on the other layer or region, or indirectly on the other layer or region, for example, layers/components between the layer or region and another layer or another region. And, for example, when the component is reversed, the layer or region may be "below" or "under" the other layer or region. In the present disclosure, the term "electrical connection" refers to that two components are directly electrically connected with each other, or the two components are electrically connected via one or more other components.

In the present disclosure, the term "and/or" is just an association relationship describing related objects, indicating that there may be three relationships. For example, A and/or B, may mean: A alone exists, A and B exist simultaneously, or B alone exists. Further, the character "/" in the present disclosure generally indicates that the related objects are an "or" relationship.

In the present disclosure, the term "electrical connection" may refer to a direct electrical connection between two components, or may refer to an electrical connection between two components via one or more other components. The term "drive" may mean "control" or "operate". The term "part" may mean "partially". The term "pattern" may refer to a "member". The term "end" may refer to an "end segment" or an "end edge". The display panel may be a display device or a module/part of a display device.

The present disclosure provides a display device and its driving method.

In one embodiment shown in FIG. 1, the display device may include a display panel 100. The display panel 100 may include pixel circuits 20 arranged in multiple rows. The pixel circuits 20 may be used to drive a plurality of light-emitting elements 30.

As shown in FIG. 1, in one embodiment, the pixel circuits 20 may be distributed in an array in a first direction X and a second direction Y, and the plurality of light-emitting elements 30 may also be distributed in an array in the first direction X and the second direction Y. The first direction X and the second direction Y may intersect each other. For example, in one embodiment, the first direction X may be a row direction, and the second direction Y may be a column direction.

One pixel circuit 20 may be electrically connected to one corresponding light-emitting element 30 of the plurality of light-emitting elements 30, and the pixel circuit 20 may be used to drive the corresponding light-emitting element 30 to emit light. The light-emitting element 30 may include an organic light-emitting diode (OLED). Further, the pixel circuit 20 may be electrically connected to a data line DATA.

Figure 2:
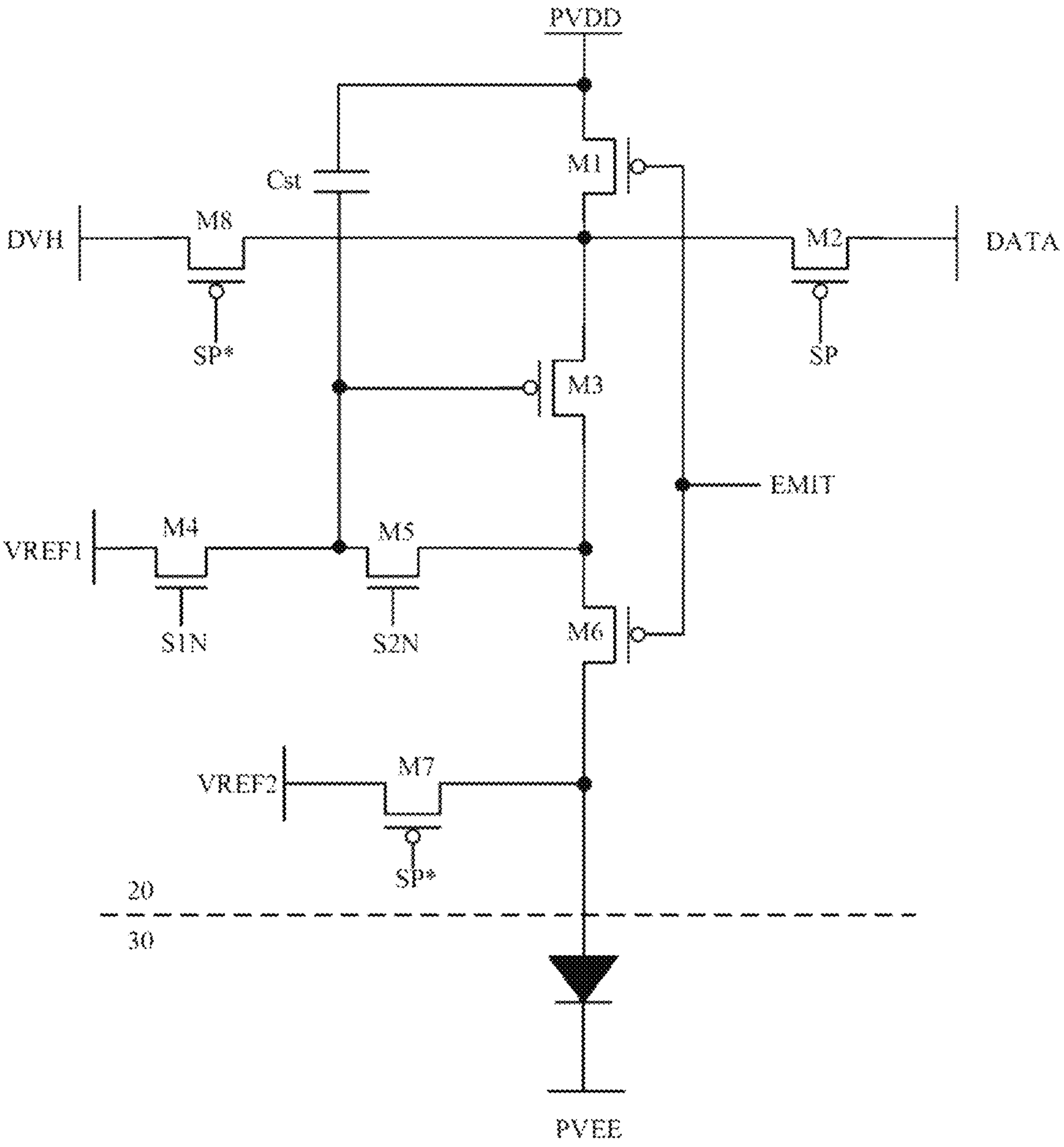
FIG. 2 illustrates a circuit structure of a pixel driving circuit of an exemplary display device consistent with various disclosed embodiments in the present disclosure.

In one embodiment, as shown in FIG. 2, one pixel circuit 20 may include a driving transistor M3, and light-emitting control transistors M1 and M6. The driving transistor M3 may be used to generate a driving current to drive one corresponding light-emitting element 30 to emit light, and the magnitude of the driving current may affect the brightness of the corresponding light-emitting element 30. The light-emitting control transistors M1 and M6 may be used to control the corresponding light-emitting element 30 to enter a light-emitting stage. For example, when the light-emitting control transistors M1 and M6 are turned on, the driving current generated by the driving transistor M3 may be transmitted to the corresponding light-emitting element 30, and the corresponding light-emitting element 30 may emits light.

In some embodiments, the pixel circuit 20 may further include a data writing transistor M2, a threshold compensation transistor M5, a reset transistor M4, and an initialization transistor M7.

Gates of the light-emitting control transistors M1 and M6 may be electrically connected to a light-emitting control signal line EMIT. Gates of at least some different transistors among the data writing transistor M2, the threshold compensation transistor M5, the reset transistor M4, and the initialization transistor M7 may be electrically connected to different scan lines.

The driving process of the display panel may include first stages and a display stage. The first stages may be located before and/or after the display stage. The display stage may include at least one display frame. One of the first stages before the display stage may be called a power-on stage, and another one of the first stages after the display stage may be called a power-off stage.

In the first stages, light-emitting control transistors M1 and M6 in each row of pixel circuits 20 may be turned off, and/or the driving transistor M3 in each row of pixel circuits 20 may be turned off. It can be understood that, when the light-emitting control transistors M1 and M6 in each row of pixel circuits 20 are turned off, the corresponding light-emitting elements 30 driven by each row of pixel circuits 20 may not emit light; and, when the driving transistors M3 in each row of pixel circuits 20 are turned off, the corresponding light-emitting elements 30 driven by each row of pixel circuits 20 may also do not emit light.

The duration of the first stages may be t, and the data refresh frequency of the pixel circuits 20 in the display stage may be f, $t \leq 1/f$. The data refresh frequency may be a frequency at which the data signal is effectively written to the gates of the drive transistors. 1/f may be the duration of a refresh frame, and the refresh frame may be understood as a display frame.

In the present disclosure, by controlling the duration of the power-on and/or power-off stages within one refresh frame, the time required for power-on and power-off may be shortened, enabling fast power-on and power-off, and improving the user experience. Further, in the first stages, when the light-emitting control transistors and driving transistors of each row of pixel circuits are both turned off, a double insurance to prevent the light-emitting elements from emitting light, thereby helping to avoid the flash screen of the display device during the power-on and/or power-off stages.

In some embodiments, the display device may be able to perform display with different frequencies in different areas, and the pixel circuits may have multiple data refresh frequencies during the display stage. For example, the data refresh frequency of some display areas may be 60 Hz, and the data refresh frequency of some other display areas may be 90 Hz. f may be the maximum value among multiple data refresh frequencies. When f is larger, 1/f may be smaller. Therefore, the duration t of the first stage may be smaller, further shortening the time required for powering on and off.

In some embodiments, as shown in FIG. 1 and FIG. 2, the display panel 100 may further include a plurality of emission shift circuits 40 in cascade, and the plurality of emission shift circuits 40 may be electrically connected to gates of the light-emitting control transistors M1 and M6 through the emission control signal lines EMIT. The plurality of emission shift circuits 40 may include a first emission shift circuit 41, and the first emission shift circuit 41 may be electrically connected to an emission start signal line STV_E. The emission start signal line STV_E may be electrically connected to the display driving chip 200. The display driving chip 200 may provide a start signal to the plurality of emission shift circuits 40 through the emission start signal line STV_E to trigger the plurality of emission shift circuits 40.

Figure 3:
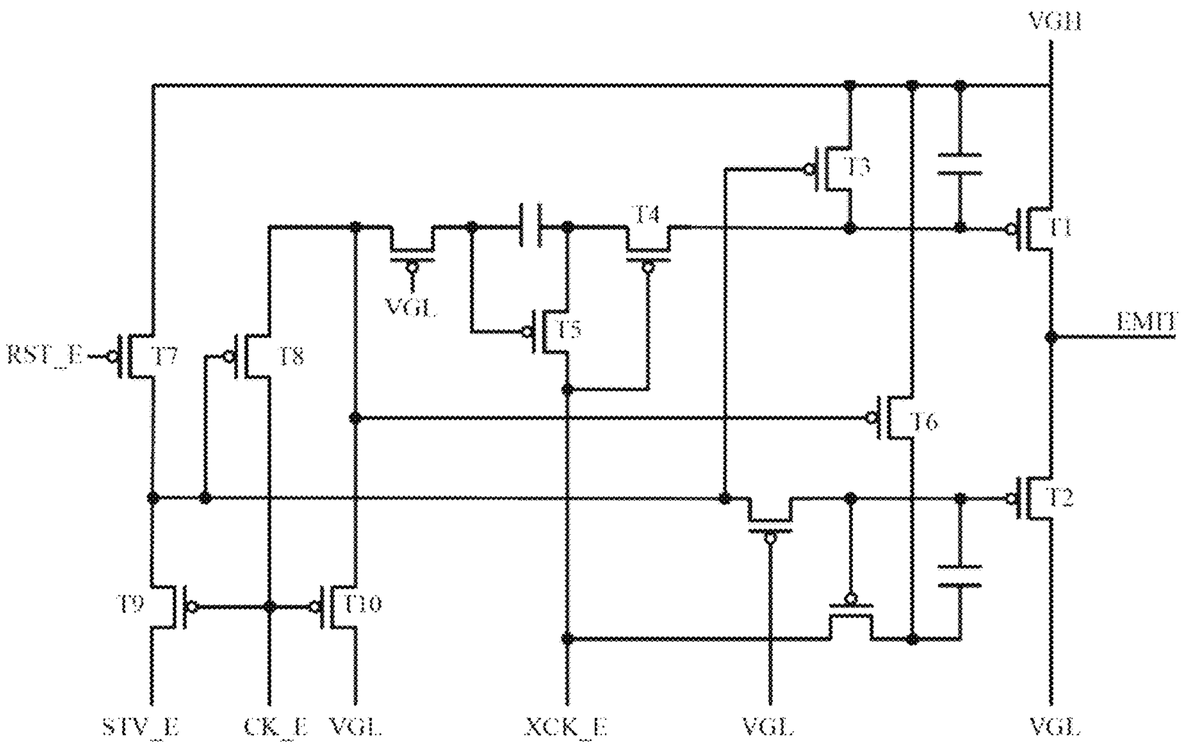
FIG. 3 illustrates a circuit structure of an emission shift circuit of an exemplary display device consistent with various disclosed embodiments in the present disclosure.

In one embodiment shown in FIG. 3, the first emission shift circuit 41 may include a first input transistor T9, a first setting transistor T7, and a first output transistor T2. The first input transistor T9 may be electrically connected between the emission start signal line STV_E and the gate of the first output transistor T2. The first electrode of the first output transistor T2 may be electrically connected to the first potential signal line VGL, and the second electrode of the first output transistor T2 may be electrically connected to the light-emitting control signal line EMIT. The second electrode of the first output transistor T2 may be connected to the output terminal of the first emission shift circuit 41.

The gate of the first setting transistor T7 may be electrically connected to the first control signal line RST_E, the first electrode of the first setting transistor T7 may be electrically connected to the second potential signal line VGH, and the second electrode of the first setting transistor T7 may be electrically connected to the gate of the first output transistor T2 (including direct electrical connection and indirect electrical connection).

The first potential signal line VGL may be used to provide the enabling voltage of the light-emitting control transistors M1 and M6, and the second potential signal line VGH may be used to provide the disabling voltage of the light-emitting control transistors M1 and M6. For example, in one embodiment, the light-emitting control transistors M1 and M6 may be P-type transistors, their enabling voltage may be the low voltage vgl, and their disabling voltage may be the high voltage vgh.

Each of the plurality of emission shift circuits 40 may have the circuit structure shown in FIG. 3. An output signal of one emission shift circuit 40 of a previous level may be used as the starting signal of one emission shift circuit 40 of a next level. A wiring may be connected between the output terminal of the emission shift circuit 40 of the previous level and the emission shift circuit 40 of the next level, and the wiring may serve as the emission start signal line electrically connected to the first input transistor T9 in the emission shift circuit 40 of the next level.

Figure 4:
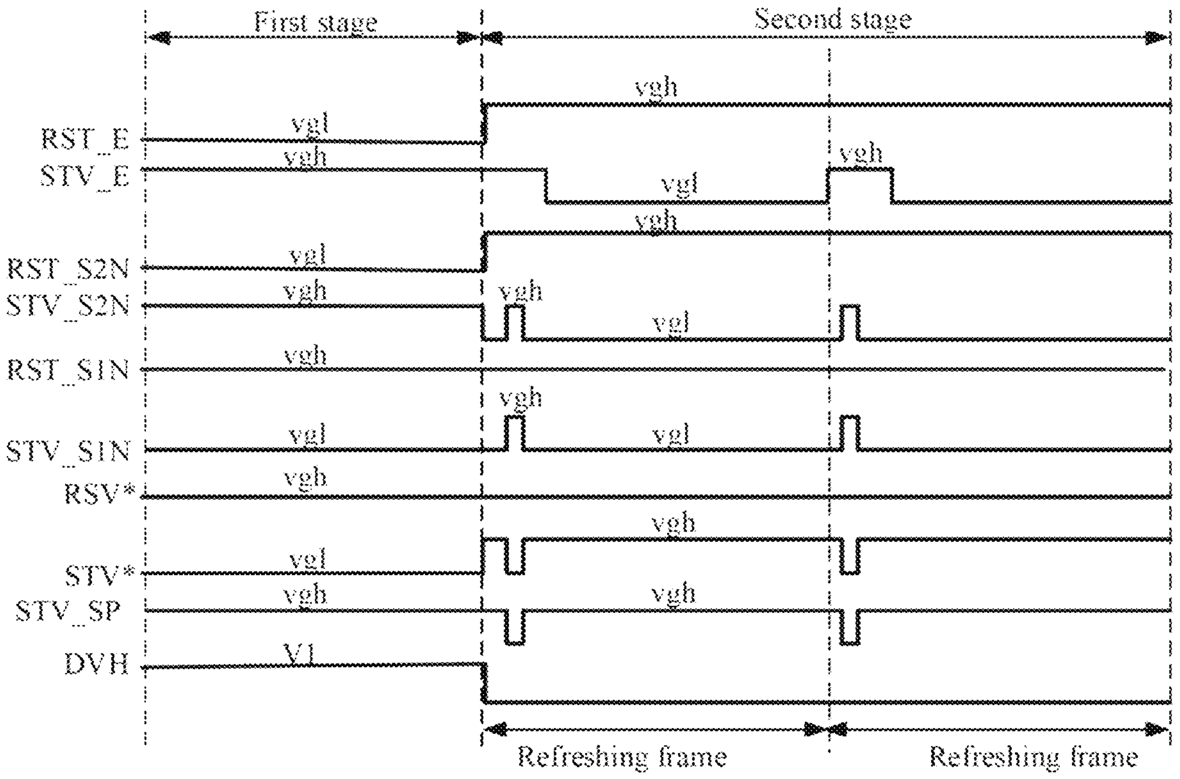
FIG. 4 illustrates a timing diagram of an exemplary display device consistent with various disclosed embodiments in the present disclosure.

As shown in FIG. 4, in the first stage, the display driving chip 200 may provide the disabling voltage (for example, the high voltage vgh) of the first output transistor T2 to the emission start signal line STV_E connected to it, and provide the enabling voltage (for example, the low voltage vgl) of the first setting transistor T7 to the first control signal to Line RST_E.

In the first stage, since the enabling voltage is on the first control signal line RST_E, the first setting transistor T7 may be turned on, and the high voltage vgh on the second potential signal line VGH may be transmitted to the gate of the first output transistor T2, such that the first output transistor T2 in each emission shift circuit 40 may be turned off. Each emission shift circuit 40 may be prevented from outputting the low voltage vgl on the first potential signal line VGL, and may instead output the high voltage vgh on the second potential signal line VGH, thereby controlling the light-emitting control transistors M1 and M6 to be turned off in the first stage.

For example, in one embodiment, as shown in FIG. 3, each emission shift circuit 40 may also be connected to a clock signal line CK_E and a clock signal line XCK_E. Both the clock signal line CK_E and the clock signal line XCK_E may be able to alternately provide high voltage vgh and low voltage vgl. There may be a misalignment in the signal transitions on the clock signal line CK_E and the clock signal line XCK_E. The signal refresh periods on the clock signal line CK_E and the clock signal line XCK_E may be the same.

For example, within one signal refresh period of the clock signal line CK_E and the clock signal line XCK_E, all of the plurality of emission shift circuits 40 may output the high voltage vgh on the second potential signal line VGH. When the signal on the clock signal line XCK_E jumps from high level to low level, the transistors T1 of a portion of the plurality of emission shift circuits 40 may be turned on, such that the portion of the plurality of emission shift circuits 40 may output the high voltage vgh on the second potential signal line VGH. When the signal on the clock signal line CK jumps from high level to low level, the transistors T1 of another portion of the plurality of emission shift circuits 40 may be turned on, such that the another portion of the plurality of emission shift circuits 40 may output the high voltage vagh on the second potential signal line VGH.

Within a data refresh frame, there may be usually multiple transitions of signals on the clock signal line CK_E and the clock signal line XCK_E. The length of a signal refresh cycle of the clock signal line CK_E and the clock signal line XCK_E may be shorter than the length of the data refresh frame.

For example, as shown in FIG. 4, during the display stage, the emission start signal line STV_E may have a normal pulse signal (including low voltage vgl and high voltage vgh), thereby controlling the light-emitting control transistors M1 and M6 to be normally turned on or off. During the display stage, the first control signal line RST_E may maintain the disabling voltage (eg, high voltage vgh), thereby controlling the first setting transistor T7 to remain turned off during the display stage.

As shown in FIG. 2, the light-emitting control transistors M1 and M6 and the driving transistor M3 may be electrically connected between the first power supply line PVDD and the first electrode of the light-emitting element 30.

In some embodiments, in the first stage, the gates of the driving transistors M3 in each row of pixel circuits 20 may be written with the first voltage V1, and the first voltage V1 may be larger than or equal to the voltage of the first power line PVDD in the display stage. The voltage of the first power line PVDD during the display stage may be a positive voltage.

The driving transistor M3 may be a P-type transistor. In the first stage, a larger first voltage V1 may be written to the gate of the driving transistor M3, to turn off the driving transistor M3 and prevent the voltage on the driving transistor M3 from flowing to the light-emitting element 30. Therefore, the light-emitting element 30 may be prevented from emitting light in the first stage, solving the problem of screen flickering in the power-on and power-off stages of the display device.

In some embodiments, the first voltage V1 may be smaller than or equal to the black state voltage VGMP. When the voltage required to write is larger, the power consumption may be larger. Therefore, in the first stage, the voltage written to the gate of the driving transistor may be controlled to be smaller than or equal to the black-state voltage VGMP, to avoid excessive power consumption.

In some embodiment, as shown in FIG. 2, the pixel circuit 20 may further include a bias transistor M8 and a threshold compensation transistor M5. The first electrode of the bias transistor M8 may be electrically connected to the bias signal line DVH, the second electrode of the bias transistor M8 may be electrically connected to the first electrode of the driving transistor M3. The first electrode of the threshold compensation transistor M5 may be electrically connected to the second electrode of the driving transistor M3, and the second electrode of the threshold compensation transistor M5 may be electrically connected to the gate of the driving transistor M3.

In the first stage, the bias transistors M8 and the threshold compensation transistors M5 in each row of pixel circuits 10 may be turned on.

The bias signal line DVH may be electrically connected to the display driving chip 200 of the display device. In the first stage, the display driving chip 200 may provide the first voltage V1 to the bias signal line DVH.

In the present embodiment, in the first stage, the bias transistor M8 and the threshold compensation transistor M5 may be turned on, and the first voltage V1 on the bias signal line DVH may be transmitted to the first electrode of the driving transistor M3 through the bias transistor M8, and then transmitted to the gate of the driving transistor M3 through the threshold compensation transistor M5, such that the driving transistor M3 is turned off in the first stage.

For example, in one embodiment, as shown in FIG. 4, the voltage of the bias signal line DVH in the display stage may be smaller than its voltage in the first phase.

For example, in one embodiment, in the first stage, the first voltage V1 provided by the display driving chip 200 to the bias signal line DVH may be equal to the black state voltage VGMP.

In some embodiments, the bias transistors M8 in each row of pixel circuits 10 may be turned on in the first stage.

For example, in one embodiment, as shown in FIG. 1, the display panel 100 may further include a plurality of scan shift circuits 50 in cascade, and the plurality of scan shift circuits 50 may be connected to the pixel circuits 20 through scan lines SCAN. The first-level scan shift circuit 50 may be connected to the display driving chip 200 through the scan start signal line STV_S. The plurality of scan shift circuits 50 may also be electrically connected to the clock signal line CK_S and the clock signal line XCK_S.

The signal output by the plurality of scan shift circuits 50 may be used to control the state of the switching transistors in the pixel circuits 20. For example, the switching transistors may include at least one of the data writing transistor M2, the threshold compensation transistor M5, the reset transistor M4, the initialization transistor M7, or the bias transistor M8 as shown in FIG. 2.

Figure 5:
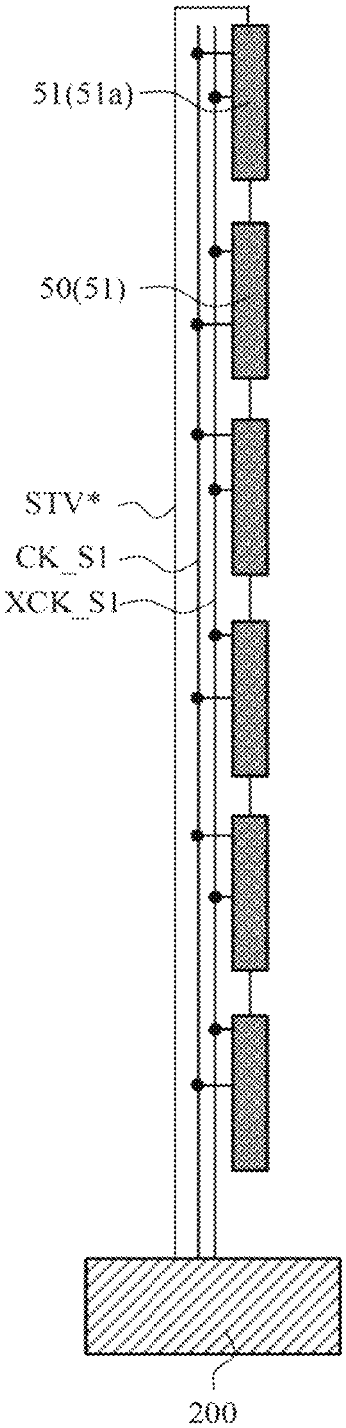
FIG. 5 illustrates a connection structure of a first scan shift circuit of an exemplary display device consistent with various disclosed embodiments in the present disclosure.

In one embodiment, for example, as shown in FIG. 5, the plurality of scan shift circuit 50 may include a plurality of first scan shift circuits 51, and the plurality of first scan shift circuits 51 may be connected in cascade. One first scan shift circuit 51 may be electrically connected to the gate of the bias transistor M8 through the first scan line SP*. The signal output by the first scan shift circuit 51 may be used to control the state of the bias transistor M8 in the corresponding pixel circuit 20.

As shown in FIG. 5, the first scan shift circuits 51 may include a first A scan shift circuit 51*a*, and the first A scan shift circuit 51*a* may be electrically connected to the first A scan start signal line STV*. The first A scan start signal line STV* may be electrically connected to the display driving chip 200. The display driving chip 200 may provide a start signal to the first A scan shift circuit 51*a* through the first A scan start signal line STV* to trigger the first A scan shift circuit 51*a*.

Figure 6:
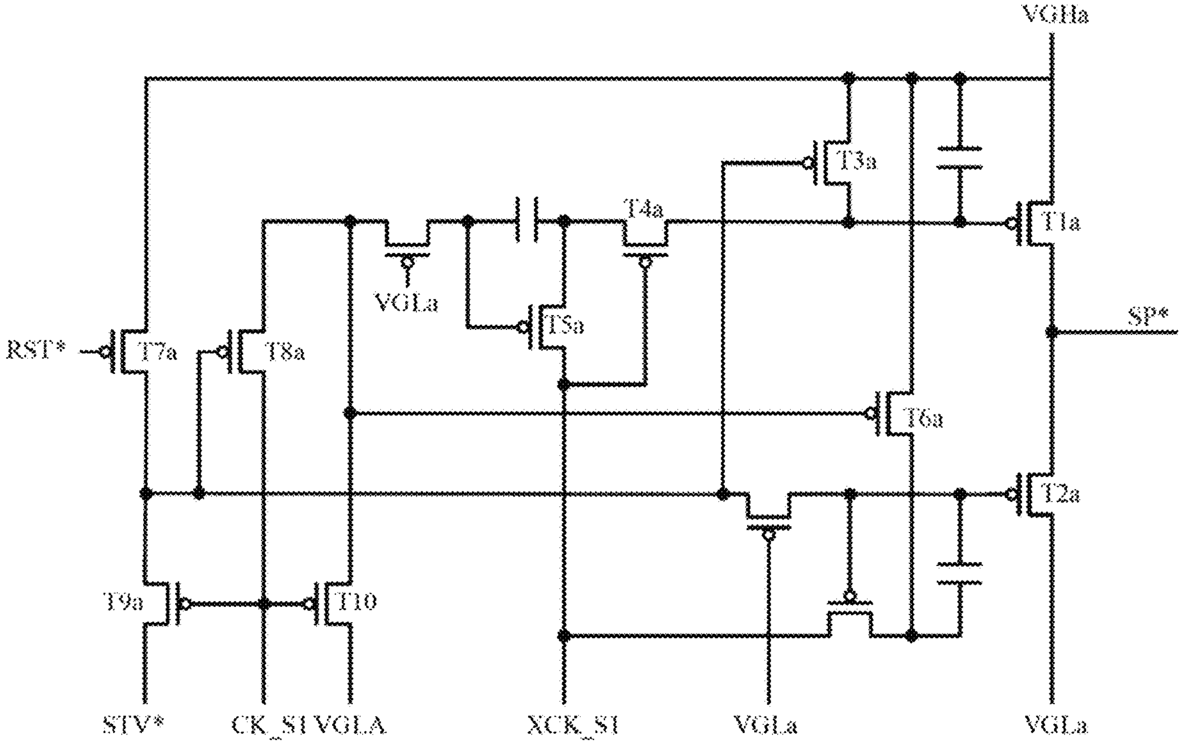
FIG. 6 illustrates a circuit structure of a first A scan shift circuit of an exemplary display device, consistent with various disclosed embodiments in the present disclosure.

As shown in FIG. 6, the first A scan shift circuit 51*a* may include a second A input transistor T9*a* and a second A output transistor T2*a*. The second A input transistor T9*a* may be electrically connected between the first A scan start signal line STV* and the gate of the second A output transistor T2*a*. The first electrode of the second A output transistor T2*a* may be electrically connected to the first A potential signal line VGLa, and the second electrode of the second A output transistor T2*a* may be electrically connected to the first scanning line SP*. The second electrode of the second A output transistor T2*a* may be connected to the output terminal of the first A scan shift circuit 51*a*.

The first A potential signal line VGLa may be used to provide an enabling voltage of the bias transistor M8. For example, the bias transistor M8 may be a P-type transistor, and the enabling voltage provided by the first A potential signal line VGLa may be the low voltage vgl. The voltages provided by the first A potential signal line VGLa and the first potential signal line VGL may be the same.

Each first scan shift circuit 51 may have a circuit structure shown in FIG. 6. The output signal of the first scan shift circuit 51 of the previous level may be used as the starting signal of the first scan shift circuit 51 of the next level. A wiring can be connected between the output terminal of the first scan shift circuit 51 of a previous level and the first scan shift circuit 51 of the next level, and the wiring may be used as the first A scan start signal line electrically connected to the second A input transistor T9*a* in the first scan shift circuit 51 of the next level.

As shown in FIG. 4, in the first stage, the display driving chip 200 may provide the enabling voltage (such as low voltage vgl) to the second A output transistor T2*a* to the first A scan start signal line STV* connected to the display driving chip 200.

In one embodiment, in the first stage, since the first A scan start signal line STV* transmits the enabling voltage, the second A output transistor T2*a* may be turned on, such that the first scan shift circuit 51 outputs the low voltage vgl on the first A potential signal line VGLa to control the bias transistor M8 to be turned on in the first stage.

For example, as shown in FIG. 6, each first scan shift circuit 51 may also be connected to the clock signal line CK_S1 and the clock signal line XCK_S1. Both the clock signal line CK_S1 and the clock signal line XCK_S1 may alternately provide high voltage vgh and low voltage vgl.

Figure 7:
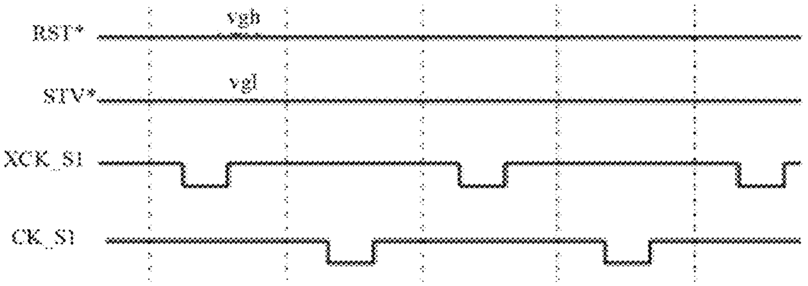
FIG. 7 illustrates a timing diagram of FIG. 6 consistent with various disclosed embodiments in the present disclosure.

When no signal is input to the first scan shift circuit 51 (for example, in the initial state), the potential inside the first scan shift circuit 51 may default to the ground potential GND. As shown in FIG. 7, in the first stage, when the voltage on the clock signal line CK_S1 jumps to low voltage for the first time, the second A input transistor T9*a* may be turned on, and the low voltage vgl on the first A scan start signal line STV* may be input to the gate of the second A output transistor T2*a*, causing the second A output transistor T2*a* to be turned on. Only when the first A scan start signal line STV* has the high voltage vgh, the first scan shift circuit 51 may output the high voltage vgh. Within a data refresh frame, there may be usually multiple transitions of the signals on the clock signal line CK_S1 and the clock signal line XCK_S1. Therefore, the duration for which all the first scan shift circuits 51 output the low voltage vgl may be smaller than the duration of one data refresh frame.

For example, as shown in FIG. 4, during the display stage, the first A scan start signal line STV* may have a normal pulse signal (including the low voltage vgl and the high voltage vgh), thereby controlling the bias transistor M8 to be turned on or off normally.

In some embodiments, as shown in FIG. 6, the first A scan shift circuit 51*a* may also include a second A setting transistor T7*a*. The gate of the second A setting transistor T7*a* may be electrically connected to the second A control signal line RST*, the first electrode of the second A setting transistor T7*a* may be electrically connected to the second A potential signal line VGHa, and the second electrode of the second A setting transistor T7*a* may be electrically connected to the gate of the second A output transistor T2*a*.

The second A potential signal line VGHa may be used to provide a disabling voltage of the bias transistor M8. For example, the bias transistor M8 may be a P-type transistor, and the disabling voltage provided by the second A potential signal line VGHa may be the high voltage vgh. The voltages provided by the second A potential signal line VGHa and the second potential signal line VGH may be the same.

As shown in FIG. 4, in the first stage, the display driving chip 200 may provide the disabling voltage of the second A setting transistor T7*a* to the second control signal line A RST*. That is, in the first stage, the second A setting transistor T7*a* may remain in the off state, thereby preventing the high voltage on the second A potential signal line VGHa from being transmitted to the gate of the second A output transistor T2*a*.

In the present disclosure, by setting the second A setting transistor T7*a*, the state of the second A setting transistor T7*a* may be flexibly controlled according to needs, thereby improving the flexibility of the circuit.

For example, as shown in FIG. 4, during the display stage, the second control signal line A RST* may maintain a disabling voltage (such as the high voltage vgh), thereby controlling the second A setting transistor T7*a* to remain off during the display stage.

The above are some examples in which the bias transistors M8 in each row of pixel circuits 10 are turned on in the first stage. It should be noted that, in various embodiments of the present disclosure, the bias transistors M8 in each row of pixel circuits 10 may be turned on in the first stage by using different manners which include, but are not limited to, the above examples.

In some embodiments, the threshold compensation transistors M5 in each row of pixel circuits 10 may be turned on in the first stage.

Figure 8:
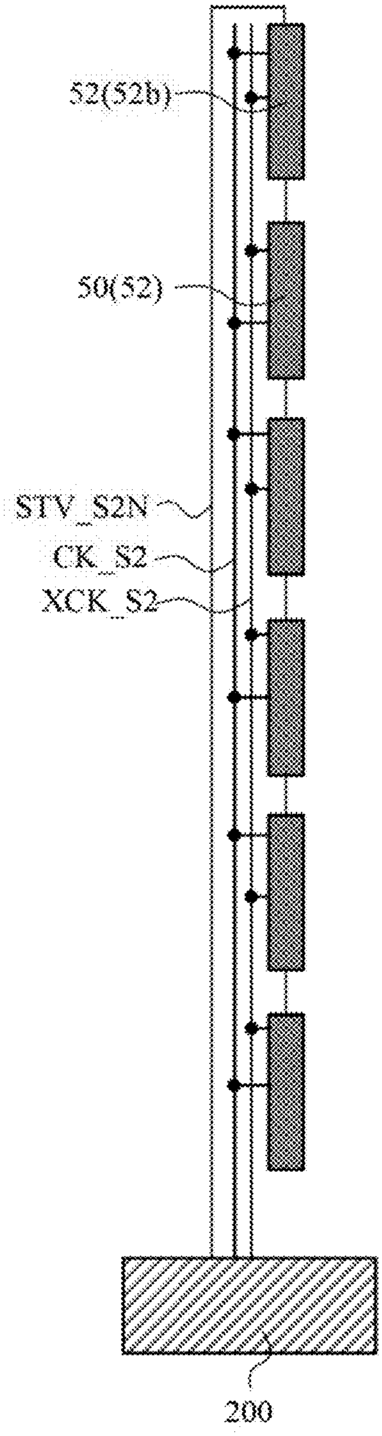
FIG. 8 illustrates a connection structure of a second scan shift circuit of an exemplary display device consistent with various disclosed embodiments in the present disclosure.

In one embodiment, as shown in FIG. 8, each of the plurality of scan shift circuits 50 may include a second scan shift circuit 52, and a plurality of second scan shift circuits 52 may be connected in cascade. One second scan shift circuit 52 may be electrically connected to the gate of the threshold compensation transistor M5 in the corresponding pixel circuit 20 through the second scan line S2N. The signal output by the second scan shift circuit 52 may be used to control the state of the threshold compensation transistor M5 in the corresponding pixel circuit 20.

As shown in FIG. 8, the plurality of second scan shift circuits 52 may include a second B scan shift circuit 52*b*, and the second B scan shift circuit 52*b* may be electrically connected to the second B scan start signal line STV_S2N. The second B scan start signal line STV_S2N may be electrically connected to the display driving chip 200. The display driving chip 200 may provide a start signal to the second scan shift circuit 52 through the second B scan start signal line STV_S2N to trigger the second scan shift circuit 52.

Figure 9:
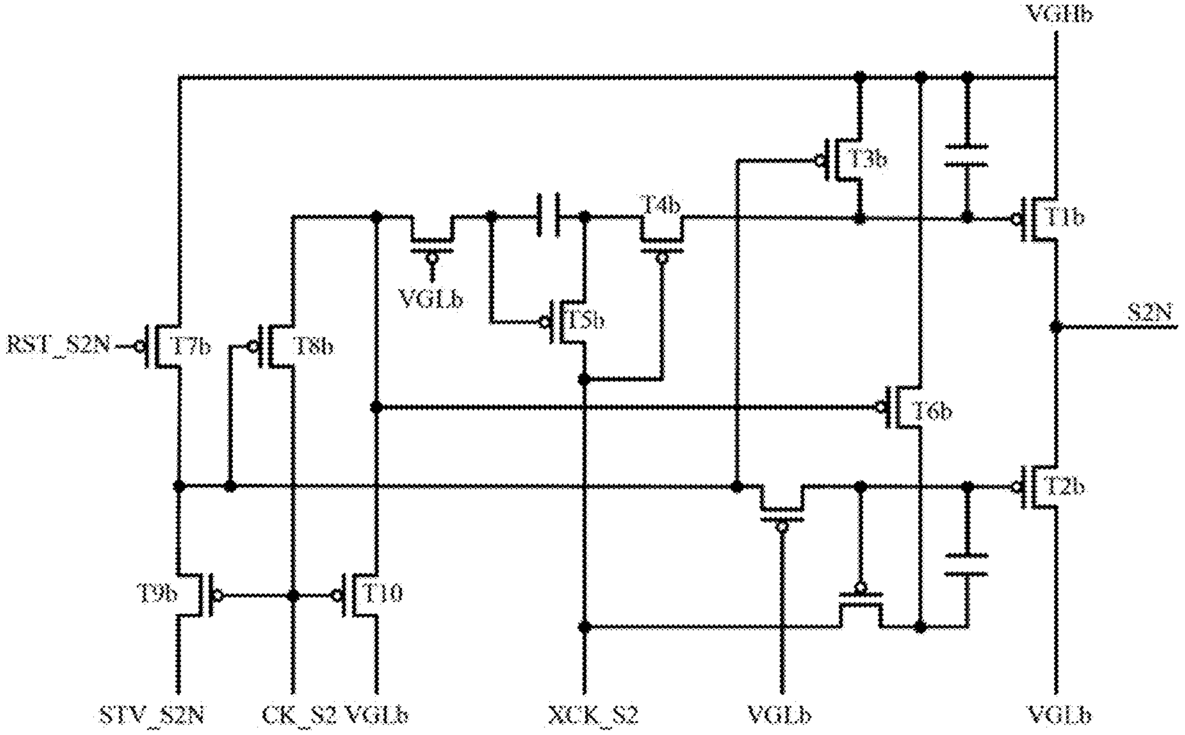
FIG. 9 illustrates a circuit structure of a second B scan shift circuit of an exemplary display device, consistent with various disclosed embodiments in the present disclosure.

As shown in FIG. 9, the second B scan shift circuit 52*b* may include a second B input transistor T9*b*, a second B setting transistor T7*b* and a second B output transistor T2*b*. The second B input transistor T9*b* may be electrically connected between the second B scan start signal line TV_S2N and the gate of the second B output transistor T2*b*. The first electrode of the second B output transistor T2*b* may be electrically connected to the first B potential signal line VGLb, and the second electrode of the second B output transistor T2*b* may be electrically connected to the second scan line S2N. The second electrode of the second B output transistor T2*b* may be connected to the output terminal of the second B scan shift circuit 52*b*.

The gate of the second B setting transistor T7*b* may be electrically connected to the second B control signal line RST_S2N. The first electrode of the second B setting transistor T7*b* may be electrically connected to the second B potential signal line VGHb. The second electrode of the second B setting transistor T7*b* may be electrically connected to the gate of the second B output transistor T2*b*.

The first B potential signal line VGLb may be used to provide a disabling voltage of the threshold compensation transistor M5, and the second B potential signal line VGHb may be used to provide the enabling voltage of the threshold compensation transistor M5. For example, in one embodiment, the threshold compensation transistor M5 may be N-type, the disabling voltage provided by the first B potential signal line VGLb may be the low voltage vgl. and the enabling voltage provided by the second B-potential signal line VGHb may be the high voltage vgh. The voltages provided by the first B potential signal line VGLb and the first potential signal line VGL may be the same. The voltages provided by the second B potential signal line VGHb and the second potential signal line VGH may be the same.

Each second scan shift circuit 52 may have a circuit structure shown in FIG. 9. The output signal of the second scan shift circuit 52 of the previous level may be used as the starting signal of the second scan shift circuit 52 of the next level. A wiring may be connected between the output terminals of the second scan shift circuit 52 of the previous level and the second scan shift circuit 52 of the next level, and the wiring may serve as the second B scan start signal line electrically connected to the second B input transistor T9*b* in the second B scan shift circuit of the next level.

As shown in FIG. 2, the threshold compensation transistor M5 may be an N-type transistor. For an N-type transistor, when its gate is at a high voltage vgh, the N-type transistor may be turned on, and when its gate is at a low voltage vgl, the N-type transistor may be turned off.

For the N-type threshold compensation transistor M5, for example, as shown in FIG. 4, in the first stage, the display driving chip may provide the disabling voltage (for example, the high voltage vgh) of the second B output transistor T2*b* to the second B scan start signal line STV_S2N, and provide the enabling voltage (for example, the low voltage vgl) of the second B setting transistor T7*b* to the second B control signal line RST_S2N.

In the present embodiment, in the first stage, since the second B scan start signal line STV_S2N has the disabling voltage and the second B control signal line RST_S2N has the enabling voltage, the second B setting transistor T7*b* may be turned on, and the second B output transistor T2*b* may be turn off, to make the second scan shift circuit 52 output the high voltage vgh on the second B potential signal line VGHb. Therefore, the N-type threshold compensation transistor M5 may be turned on in the first stage.

For example, as shown in FIG. 9, in one embodiment, each second scan shift circuit 52 may also be connected to the clock signal line CK_S2 and the clock signal line XCK_S2. Both the clock signal line CK_S2 and the clock signal line XCK_S2 may alternately provide high voltage vgh and low voltage vgl.

When no signal is input to the second scan shift circuit 52 (for example, in the initial state), the potential inside the second scan shift circuit 52 may default to the ground potential GND. In the first stage, when the voltage on the clock signal line XCK_S2 jumps to low voltage for the first time, the transistor T1*b* may be turned on, and the high voltage vgh on the second B scan start signal line VGHb may be input to the second scan line S2N. Within a data refresh frame, there may be usually multiple transitions of the signals on the clock signal line CK_S2 and the clock signal line XCK_S2. Therefore, the duration for which all the second scan shift circuit 52 output the high voltage vgh may be smaller than the duration of one data refresh frame.

For example, as shown in FIG. 4, during the display stage, the second B scan start signal line STV* may have a normal pulse signal (including the low voltage vgl and the high voltage vgh), thereby controlling the threshold compensation transistor M5 to be turned on or off normally. In the display stage, the second B control signal line RST_S2N may maintain the disabling voltage (for example, the high voltage vgh), thereby controlling the second B setting transistor T7*b* to be turned off in the display stage.

Figure 10:
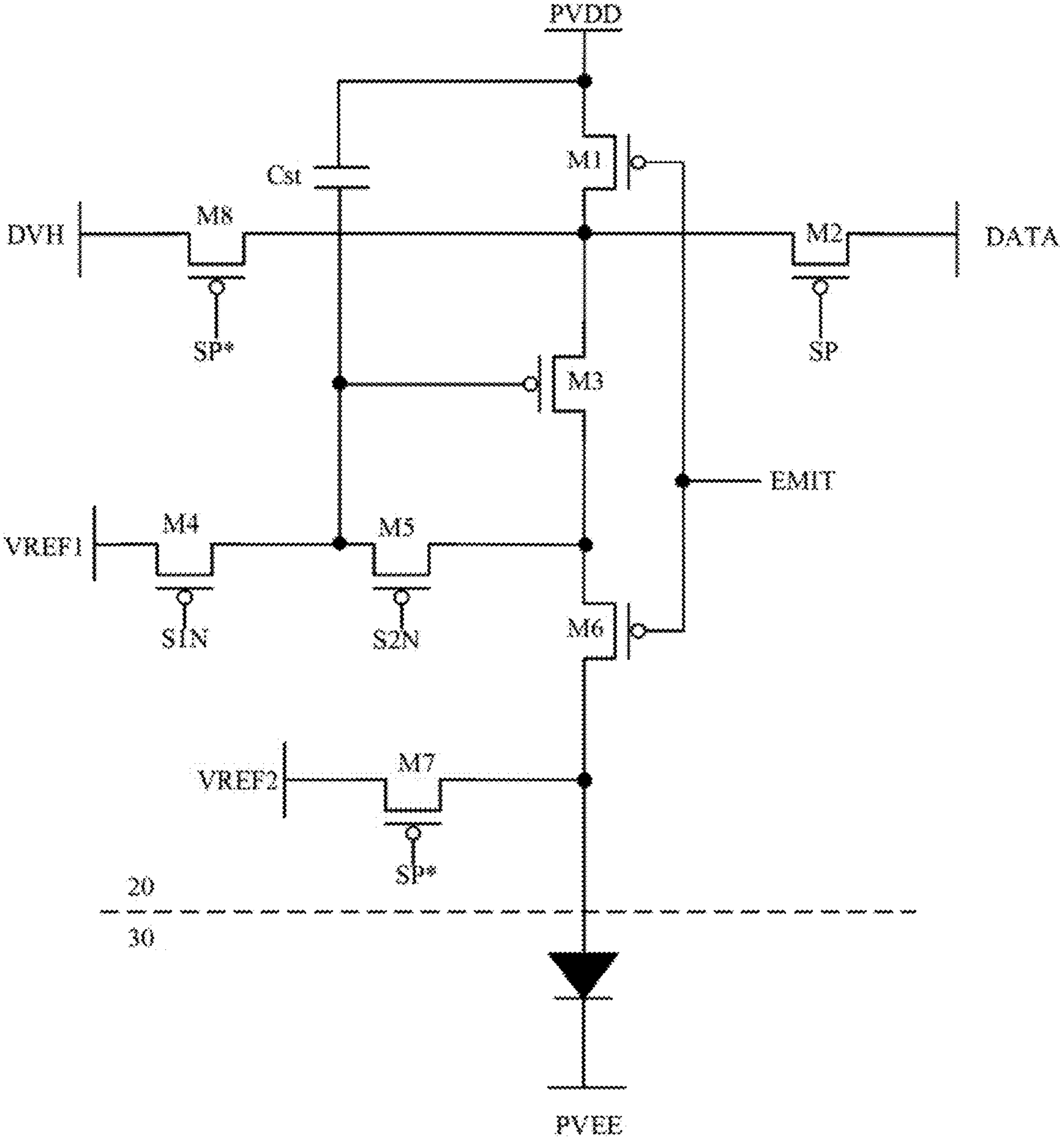
FIG. 10 illustrates a circuit structure of another pixel circuit of an exemplary display device consistent with various disclosed embodiments in the present disclosure.

In some other embodiments, as shown in FIG. 10, the threshold compensation transistor M5 may be a P-type transistor. For the P-type transistor, when the gate is at the high voltage vgh, the P-type transistor may be turned off; and when the gate is at the low voltage vgl, the P-type transistor may be turned on.

The P-type threshold compensation transistor M5 may be controlled still using the second scan shift circuits shown in FIG. 8 and FIG. 9. For the P-type threshold compensation transistor M5, in one embodiment, the transistor T7*p* shown in FIG. 9 may not be provided.

Figure 11:
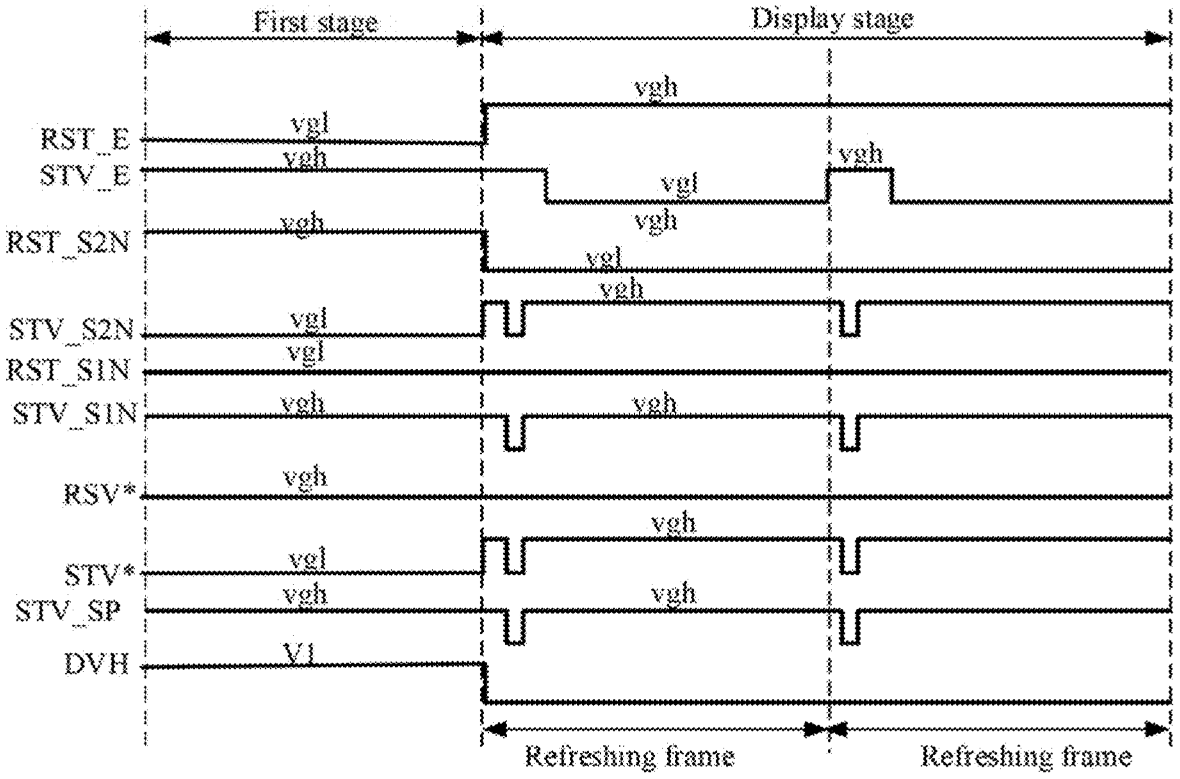
FIG. 11 illustrates another timing diagram of an exemplary display device consistent with various disclosed embodiments in the present disclosure.

Different from the control timing of the N-type threshold compensation transistor M5, for the P-type threshold compensation transistor M5, for example, as shown in FIG. 11, in the first stage, the display driving chip may provide the enabling voltage (for example, the low voltage vgl) of the second B output transistor T2*b* to the second B scan start signal line STV_S2N.

In the present embodiment, in the first stage, since the second B scan start signal line STV_S2N has the enabling voltage, the second B output transistor T2*b* may be turned on, thereby causing the second scan shift circuit 52 to output the low voltage on the first A potential signal line VGLa and controlling the threshold compensation transistor M5 to be turned on in the first stage.

In one embodiment, the duration of all the second scan shift circuits 52 outputting the low voltage vgl may be smaller than the duration of one data refresh frame, which is similar to the above example in which the duration of all the first scan shift circuits 51 outputting the low voltage vgl is smaller than the duration of one data refresh frame.

In some embodiments, for the P-type threshold compensation transistor M5, the transistor T7*b* shown in FIG. 9 may also be provided. For example, as shown in FIG. 11, in the first stage, the display driving chip may also provide the disabling voltage (for example, the high voltage vgh) of the second B setting transistor T7*b* to the second B control signal to Line RST_S2N. That is, in the first stage, the second B setting transistor T7*b* may remain in the off state, thereby preventing the high voltage on the second B potential signal line VGHb from being transmitted to the gate of the second B output transistor T2*b*.

The above embodiments in which the threshold compensation transistors M5 in each row of pixel circuits 10 are all be turned on in the first stage are used as examples to illustrate the present disclosure, and do not limit the scope of the present disclosure. The threshold compensation transistors M5 in each row of pixel circuits 10 may all be turned on in the first stage using suitable manners which include, but are not limited to, the above examples.

In some embodiments, as shown in FIG. 2, the pixel circuit 20 may further include a reset transistor M4. The reset transistor M4 may be electrically connected between the gate of the driving transistor M3 and the reset signal line VREF1.

In the first stage, the bias transistors M8 of each row of pixel circuits 10 may be all turned on, the threshold compensation transistors M5 of each row of pixel circuits 10 may be all turned on, and the reset transistors M4 of each row of pixel circuits 10 may be all turned off.

In this embodiment, the reset transistor M4 may be turned off, which prevents the reset signal on the reset signal line VREF1 from being written to the gate of the driving transistor M3, thereby avoiding affecting the off state of the driving transistor M3 in the first stage.

In some embodiments, in the first stage, the display driving chip 200 may not provide the reset voltage to the reset signal line VREF1. In the display stage, the display driving chip 200 may provide the reset voltage to the reset signal line VREF1. That is, the reset signal line VREF1 may be powered on at the beginning of the display stage and powered off at the end of the display stage.

In some embodiments, the reset transistors M4 in each row of pixel circuits 10 may all be turned off in the first stage.

Figure 12:
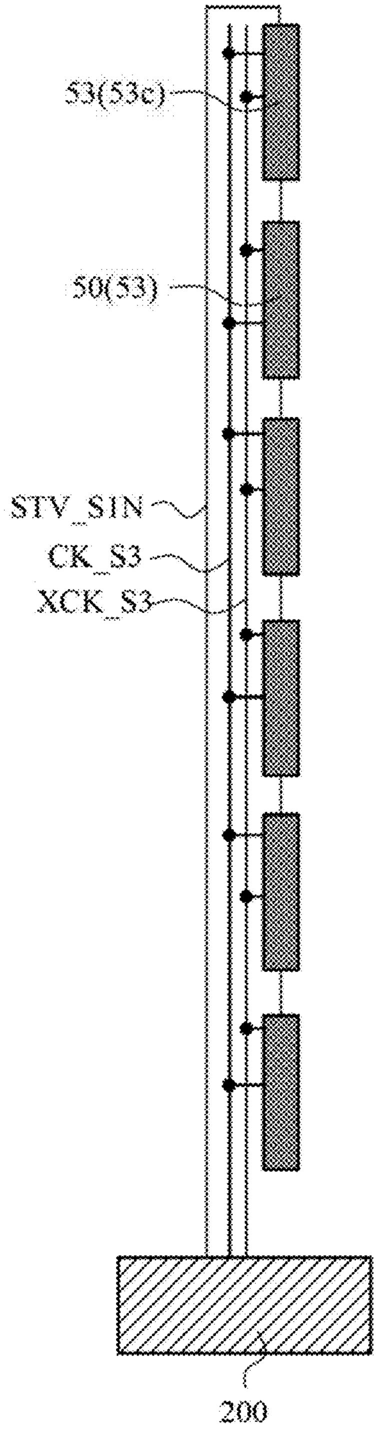
FIG. 12 illustrates a connection structure of a third scan shift circuit of an exemplary display device consistent with various disclosed embodiments in the present disclosure.

As shown in FIG. 12, one scan shift circuit 50 may include a third scan shift circuit 53, and a plurality of third scan shift circuits 53 may be connected in cascade. One third scan shift circuit 53 may be electrically connected to the gate of the reset transistor M4 in one corresponding pixel circuit through the third scan line S1N, and the signal output by the third scan shift circuit 53 may be used to control the state of the reset transistor M4 in the corresponding pixel circuit 20.

As shown in FIG. 12, the plurality of third scan shift circuits 53 may include a third C scan shift circuit 53*c*, and the third C scan shift circuit 53*c* may be electrically connected to the third C scan start signal line STV_S1N. The third C scan start signal line STV_S1N may be electrically connected to the display driving chip 200. The display driving chip 200 may provide a start signal to the third scan shift circuit 53 through the third scan start signal line STV_S1N to trigger the third scan shift circuit 53.

Figure 13:
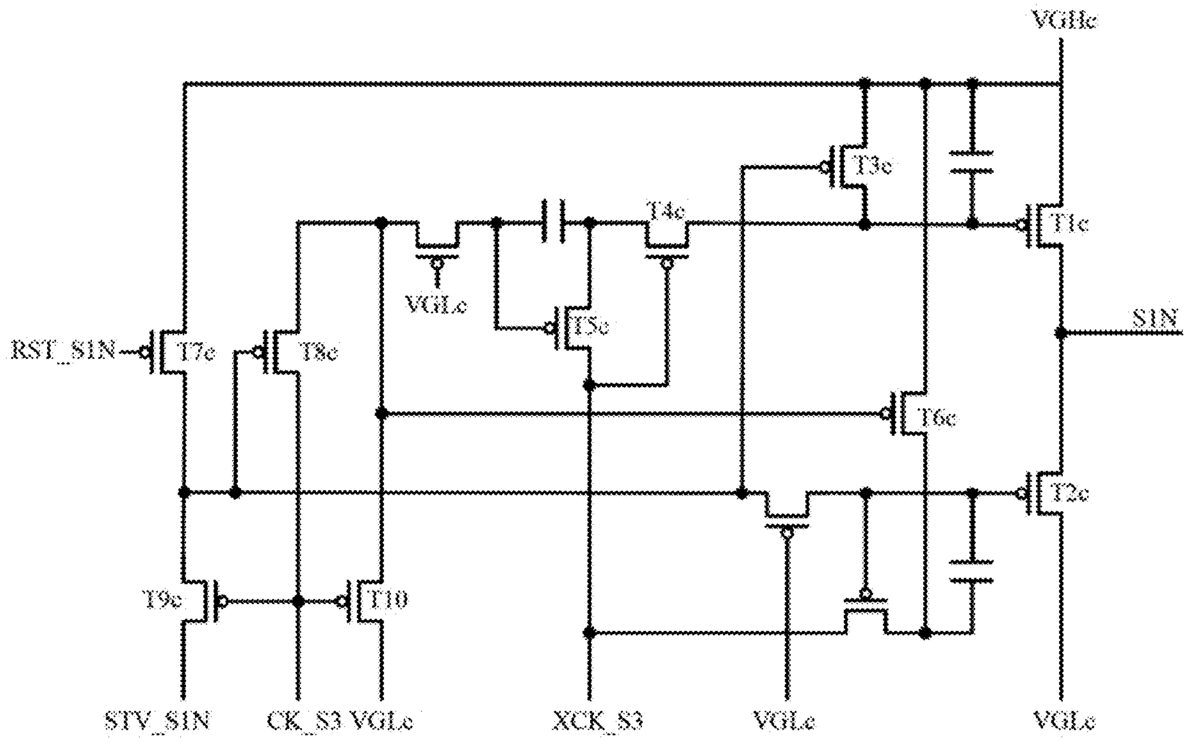
FIG. 13 illustrates a circuit structure of a third C scan shift circuit of an exemplary display device, consistent with various disclosed embodiments in the present disclosure.

As shown in FIG. 13, the third C scan shift circuit 53*c* may include a third C input transistor T9*c*, a third C setting transistor T7*c* and a third C output transistor T2*c*. The third C input transistor T9*c* may be electrically connected between the third C start signal line STV_S1N and the gate of the third C output transistor T2*c*, the first electrode of the third C output transistor T2*c* may be electrically connected to the first C potential signal line VGLc, and the second electrode of the third C output transistor T2*c* may be electrically connected to the third scan line S1N.

The gate of the third C setting transistor T7*c* may be electrically connected to the third C control signal line RST_S1N. The first electrode of the third C setting transistor T7*c* may be electrically connected to the third C potential signal line VGHc. The second electrode of the third C setting transistor T7*c* may be electrically connected to the gate of the third C output transistor T2*c*.

The first C potential signal line VGLc may be used to provide a disabling voltage of the reset transistor M4, and the second C potential signal line VGHc may be used to provide the enabling voltage of the reset transistor M4. For example, in one embodiment, the reset transistor M4 may be N-type, the disabling voltage provided by the first C potential signal line VGLc may be the low voltage vgl. and the enabling voltage provided by the second C potential signal line VGHc may be the high voltage vgh. The voltages provided by the first C potential signal line VGLc and the first potential signal line VGL may be the same. The voltages provided by the second C potential signal line VGHc and the second potential signal line VGH may be the same.

Each third scan shift circuit 53 may have a circuit structure shown in FIG. 13. The output signal of the third scan shift circuit 53 of the previous level may be used as the starting signal of the third scan shift circuit 53 of the next level. A wiring may be connected between the output terminals of the third scan shift circuit 53 of the previous level and the third scan shift circuit 53 of the next level, and the wiring may serve as the second C scan start signal line electrically connected to the second C input transistor T9*b* in the third C scan shift circuit of the next level.

For the N-type reset transistor M4, for example, as shown in FIG. 4, in the first stage, the display driving chip may provide the enabling voltage (for example, the low voltage vgl) of the third C output transistor T2*c* to the third scan start signal line STV_S1N, and provide the disabling voltage (for example, the high voltage vgh) of the third C setting transistor T7*c* to the third C control signal line RST_S1N. Therefore, the N-type reset transistors M4 in each row of pixel circuits may be turned off.

The P-type reset transistor M4 may be controlled still using the second scan shift circuits shown in FIG. 12 and FIG. 13.

Different from the control timing of the N-type reset transistor M4, for the P-type reset transistor M4, for example, as shown in FIG. 11, in the first stage, the display driving chip may provide the disabling voltage (for example, the high voltage) of the third C output transistor T2*c* to the third C scan start signal line STV_S1N, and provide the enabling voltage (for example, the low voltage vgl) of the third C setting transistor T7*c* to the third C control signal line RST_S1N. Therefore, the P-type reset transistors M4 in each row of pixel circuits may be turned off.

The above embodiments in which the reset transistors M4 in each row of pixel circuits 10 are all be turned off in the first stage are used as examples to illustrate the present disclosure, and do not limit the scope of the present disclosure. The reset transistors M4 in each row of pixel circuits 10 may all be turned off in the first stage using suitable manners which include, but are not limited to, the above examples.

In previous embodiments, in the first stage, the bias transistor M8 may be turned on, and the first voltage V1 may be written to the gate of the driving transistor M3 through the threshold compensation transistor M5. In some other embodiments, in the first stage, the first voltage V1 may be written to the gate of the driving transistor M3 through the reset transistor M4.

Figure 14:
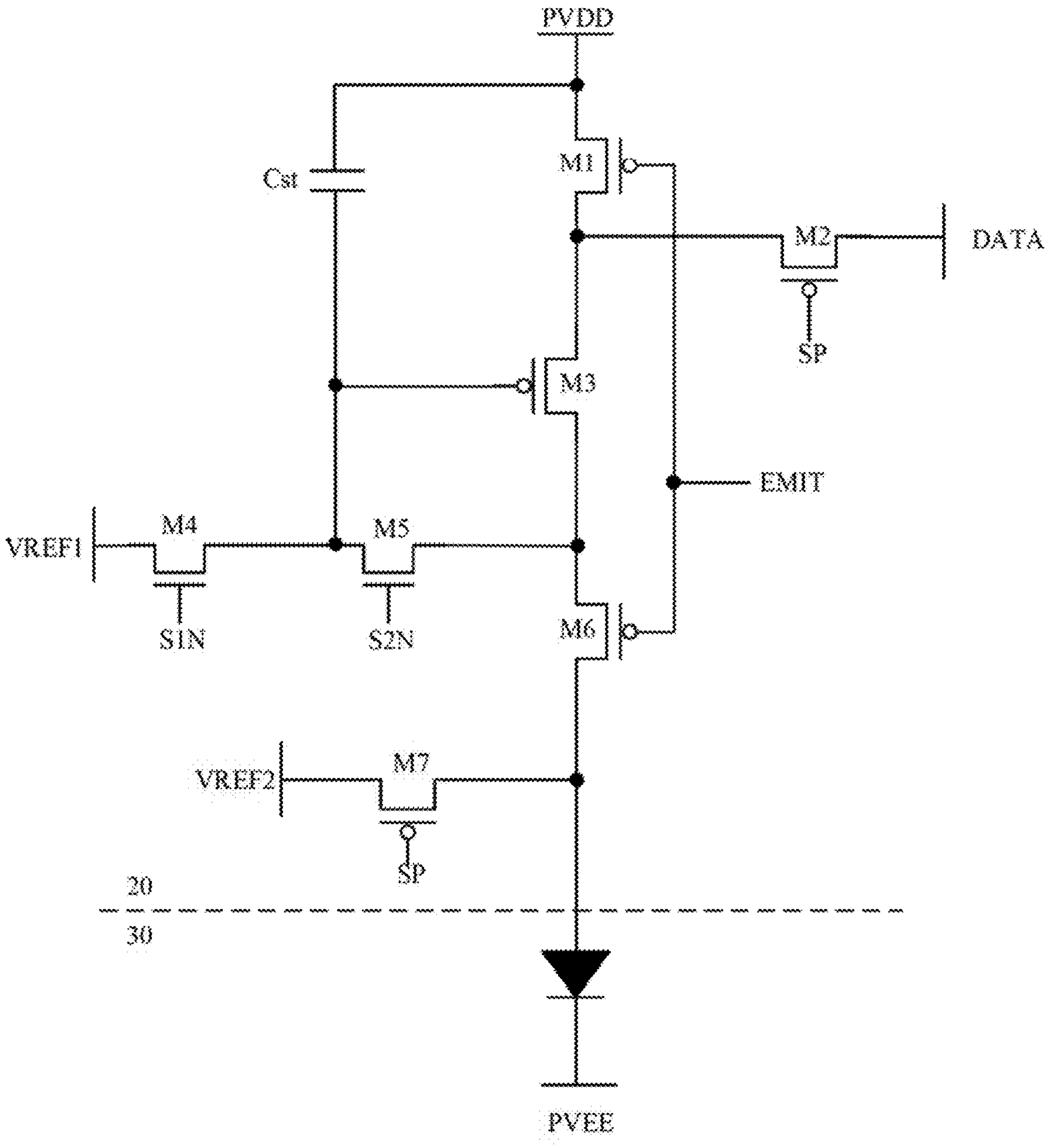
FIG. 14 illustrates a circuit structure of another pixel circuit of an exemplary display device consistent with various disclosed embodiments in the present disclosure.

In some embodiments, as shown in FIG. 14, the reset transistor M4 may be electrically connected between the gate of the driving transistor M3 and the reset signal line VREF1.

In the first stage, the reset transistors M4 in each row of pixel circuits 10 may all be turned on.

Figure 15:
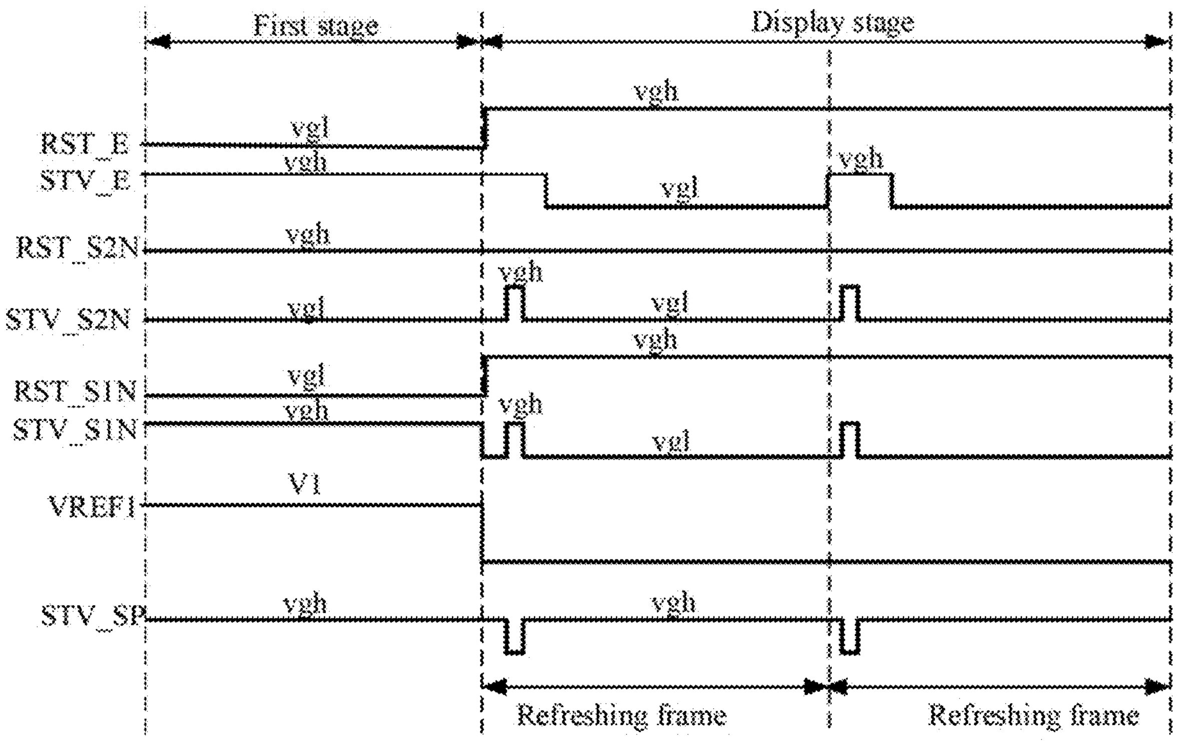
FIG. 15 illustrates another timing diagram of an exemplary display device consistent with various disclosed embodiments in the present disclosure.

As shown in FIG. 15, in the first stage, the display driving chip 200 may provide the first voltage V1 to the reset signal line VREF1

In this embodiment, in the first stage, the reset transistor M4 may be turned on, and the reset signal line VREF1 may provide the first voltage V1 which is transmitted to the gate of the driving transistor M3 through the reset transistor M4, such that the driving transistor M3 is turned off in the first stage.

For example, as shown in FIG. 15, the voltage of the reset signal line VREF1 in the display stage may be smaller than the voltage of the reset signal line VREF1 in the first stage. The voltage of the reset signal line VREF1 in the display stage may be a negative voltage.

For example, in the first stage, the first voltage V1 provided by the display driving chip 200 to the reset signal line VREF1 may be between the voltage Vdd and the black state voltage VGMP. The voltage of the first power line PVDD during the display stage may be Vdd.

In some embodiments, the reset transistors M4 in each row of pixel circuits 10 may all be turned on in the first stage.

In one embodiment, the third scan shift circuit 53 shown in FIG. 12 and FIG. 13 may be used to control the states of the reset transistor M4.

For the N-type reset transistor M4, for example, as shown in FIG. 15, in the first stage, the display driving chip may provide the disabling voltage (for example, the high voltage vgh) of the third C output transistor T2*c* to the third scan start signal line STV_S1N, and provide the enabling voltage (for example, the low voltage vgl) of the third C setting transistor T7*c* to the third C control signal line RST_S1N.

In this embodiment, in the first stage, since the third C scan start signal line STV_S1N has the disabling voltage and the third C control signal line RST_S1N has an enabling voltage, the third C setting transistor T7*c* may be turned on, and the third C output transistor T2*c* may be turned off, thereby causing the third scan shift circuit 53 to output the high voltage vgh on the second C-potential signal line VGHb. Therefore, the N-type reset transistor M4 may be turned on in the first stage.

The P-type reset transistor M4 may be controlled still using the second scan shift circuits shown in FIG. 12 and FIG. 13.

Figure 16:
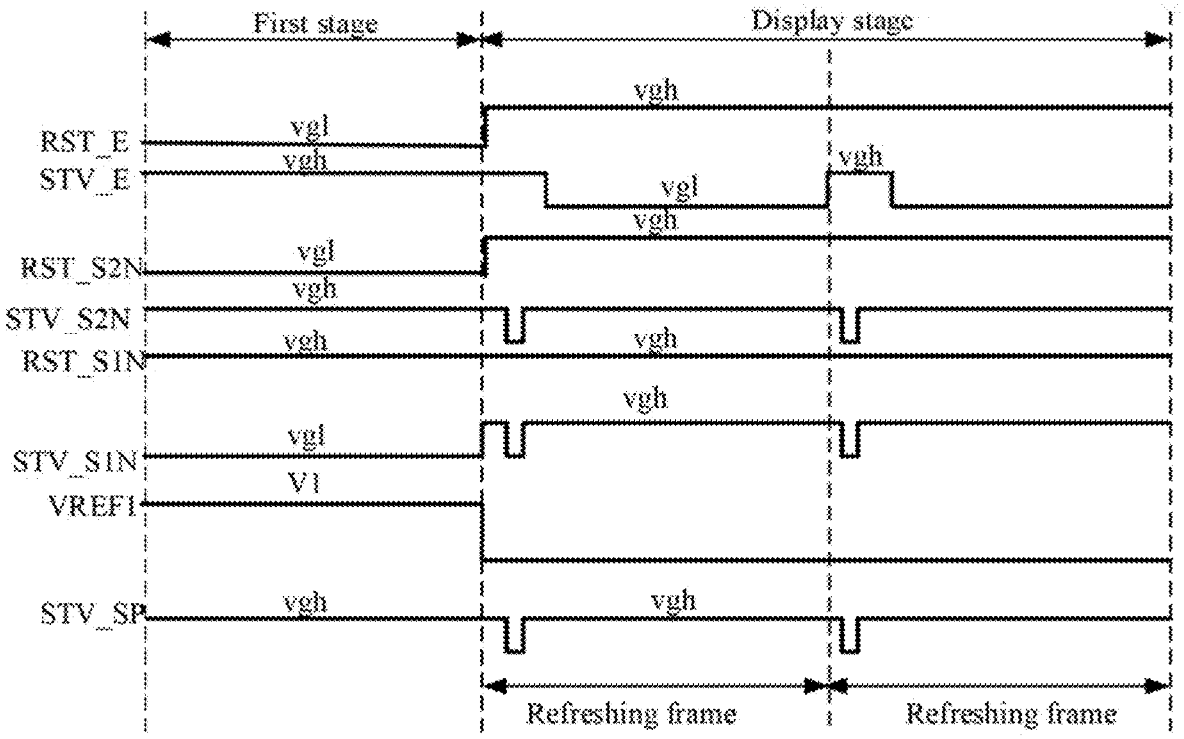
FIG. 16 illustrates another timing diagram of an exemplary display device consistent with various disclosed embodiments in the present disclosure.

Different from the control timing of the N-type reset transistor M4, for the P-type reset transistor M4, for example, as shown in FIG. 16, in the first stage, the display driving chip may provide the enabling voltage (for example, the low voltage vgl) of the third C output transistor T2*c* to the third C scan start signal line STV_S1N. Therefore, the P-type reset transistors M4 in each row of pixel circuits may be turned on.

In one embodiment, for the P-type reset transistor M4, in the first stage, as shown in FIG. 16, the display driving chip may provide the disabling voltage (for example, the high voltage vgh) of the third C setting transistor T7*c* to the third C control signal line RST_S1N.

As shown in FIG. 15 or FIG. 16, in the display stage, the third C scan start signal line STV_S1N may have normal pulse signals (including low voltage vgl and high voltage vgh), thereby controlling the reset transistor M4 to normally turn on or off. During the display stage, the third C control signal line RST_S1N may maintain the disabled voltage (for example, the high voltage vgh), thereby controlling the third C setting transistor T7*c* to remain turned off during the display stage.

The above embodiments in which the reset transistors M4 in each row of pixel circuits 10 are all turned on in the first stage are used as examples to illustrate the present disclosure, and do not limit the scope of the present disclosure. The reset transistors M4 in each row of pixel circuits 10 may all be turned on in the first stage using suitable manners which include, but are not limited to, the above examples.

In the first stage, when the reset transistor M4 is used to write the first voltage to the gate of the driving transistor M3, the threshold compensation transistors M5 of each row of pixel circuits 10 may all be turned on or all turned off.

In one embodiment, for example, when the threshold compensation transistors M5 of each row of pixel circuits 10 are turned on, the threshold compensation transistor M5 and the reset transistor M4 may be in the same state in the first stage, and the threshold compensation transistor M5 and the reset transistor M4 may share a scan shift circuit.

In another embodiment, in the first stage, the threshold compensation transistors M5 of each row of pixel circuits 10 may be all turned off.

In some embodiments, the threshold compensation transistors M5 in each row of pixel circuits 10 may be turned off in the first stage.

For example, the second scan shift circuit as shown in FIG. 8 and FIG. 9 may still be used to control the threshold compensation transistor M5 to turn off in the first stage.

For the N-type threshold compensation transistor M5, in the first stage, the display driving chip may provide the enabling voltage (such as low voltage vgl) of the second B output transistor T2*b* to the second B scan start signal line STV_S2N, and provide the disabling voltage (for example, a high voltage vgh) of the second B setting transistor T7*b* to the second B control signal line RST_S2N, thereby controlling the N-type threshold compensation transistor M5 to turn off in the first stage.

For the P-type threshold compensation transistor M5, as shown in FIG. 16, in the first stage, the display driving chip may provide the disabling voltage (such as the high voltage vgh) of the second B output transistor T2*b* to the second B scan start signal line STV_S2N, thereby controlling the P-type threshold compensation transistor M5 to turn off in the first stage.

For the P-type threshold compensation transistor M5, the transistor T7*b* shown in FIG. 9 may be also provided. For example, in the first stage, the display driving chip may provide the enabling voltage (such as low voltage vgl) of the second B setting transistor T7*b* to the second B control signal line RST_S2N, thereby controlling the P-type threshold compensation transistor M5 to turn off in the first stage.

The above embodiments in which the threshold compensation transistors M5 in each row of pixel circuits 10 are all turned off in the first stage are used as examples to illustrate the present disclosure, and do not limit the scope of the present disclosure. The threshold compensation transistors M5 in each row of pixel circuits 10 may all be turned off in the first stage using suitable manners which include, but are not limited to, the above examples.

In some embodiments, as shown in FIG. 2, FIG. 10, and FIG. 14, the data writing transistor M2 may be electrically connected between the first electrode of the driving transistor M3 and the data line DATA.

Figure 17:
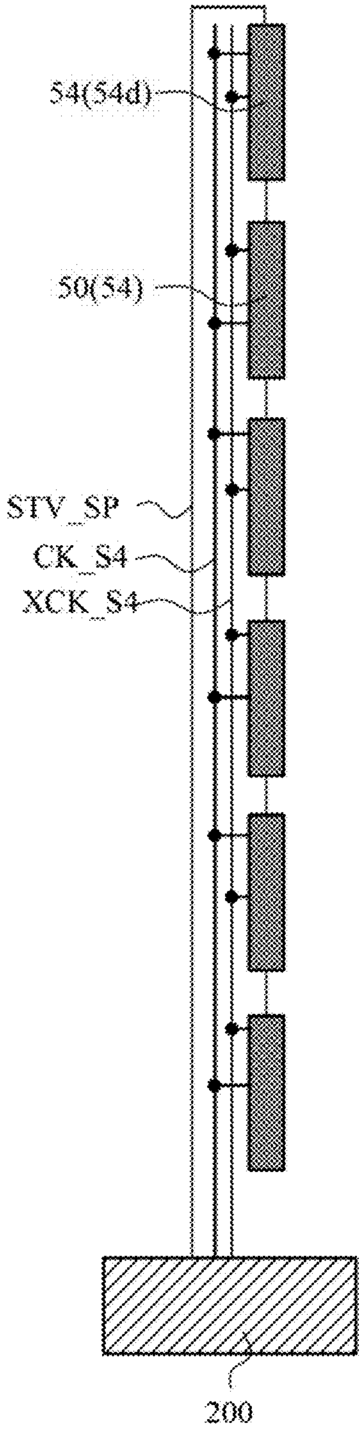
FIG. 17 illustrates a connection structure of a fourth scan shift circuit of an exemplary display device consistent with various disclosed embodiments in the present disclosure.

As shown in FIG. 17, in one embodiment, one scan shift circuit 50 may include a fourth scan shift circuit 54, and a plurality of fourth scan shift circuits 54 may be connected in cascade. One fourth scan shift circuit 54 may be electrically connected to the gate of the data writing transistor M2 in one corresponding pixel circuit through the fourth scan line SP, and the signal output by the fourth scan shift circuit 54 may be used to control the state of the data writing transistor M2 in the corresponding pixel circuit 20.

As shown in FIG. 17, the fourth scan shift circuits 54 may include a fourth D scan shift circuit 54*d*, and the fourth D scan shift circuit 54*d* may be electrically connected to the fourth D scan start signal line STV_SP. The fourth D scan start signal line STV_SP may be electrically connected to the display driving chip 200. The display driving chip 200 may provide a start signal to the fourth scan shift circuit 54 through the fourth scan start signal line STV_SP to trigger the fourth scan shift circuit 54.

Figure 18:
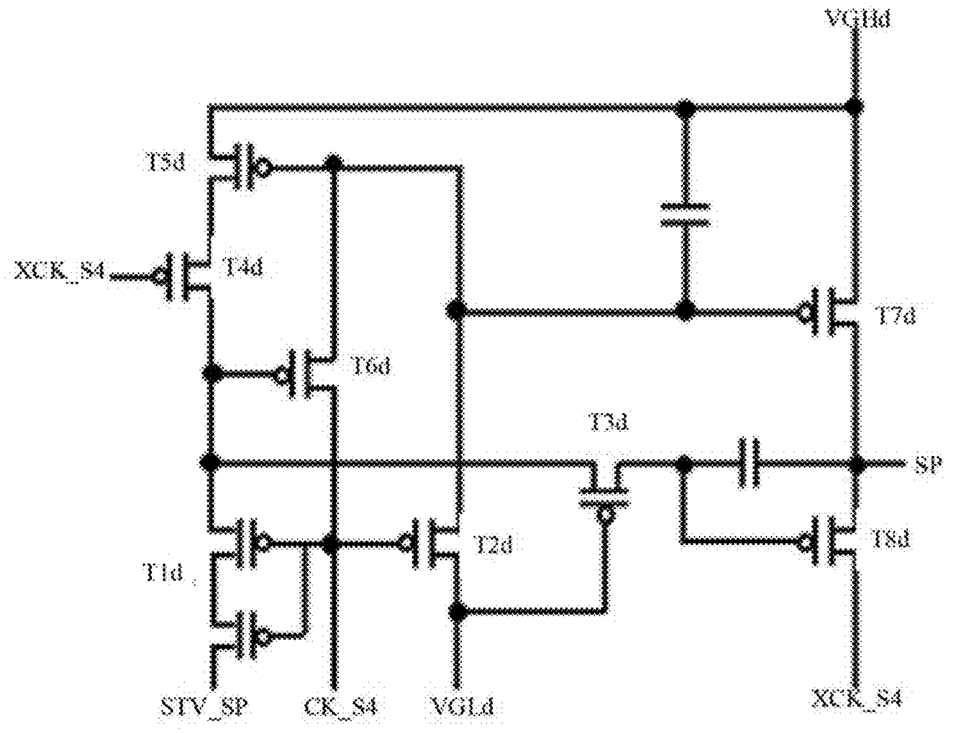
FIG. 18 illustrates a circuit structure of a fourth D scan shift circuit of an exemplary display device, consistent with various disclosed embodiments in the present disclosure.

As shown in FIG. 18, the fourth D scan shift circuit 54*d* may include a fourth D input transistor T1*d* and a fourth D output transistor T8*d*. The fourth D input transistor T1*d* may be electrically connected between the fourth D scan start signal line STV_SP and the gate of the fourth D output transistor T8*d*. The first electrode of the fourth D output transistor T8*d* may be electrically connected to the clock signal line XCK_S4, and the second electrode of the fourth D output transistor T8*d* may be electrically connected to the fourth scan line SP.

The clock signal line XCK_S4 may be used to alternately provide the enabling voltage and the disabling voltage of the data writing transistor M2. For example, for the P-type data writing transistor M2, the enabling voltage may be the low voltage vgl, and the disabling voltage may be the high voltage vgh.

Each fourth scan shift circuit 54 may have a circuit structure shown in FIG. 18. The output signal of the fourth scan shift circuit 54 of the previous level may be used as the starting signal of the fourth scan shift circuit 54 of the next level. A wiring may be connected between the output terminals of the fourth scan shift circuit 54 of the previous level and the fourth scan shift circuit 54 of the next level, and the wiring may serve as the fourth D scan start signal line electrically connected to the fourth D input transistor T1*d* in the fourth scan shift circuit 54 of the next level.

As shown in FIG. 4, in the first stage, the display driving chip may provide the disabling voltage (for example, the high voltage vgh) of the fourth D output transistor T8*d* to the fourth D scan start signal line STV_SP.

In this embodiment, in the first stage, since the fourth D scan start signal line STV_SP maintains a high voltage, the fourth D output transistor T8*d* may be prevented from being turned on in the first stage, thereby enabling each fourth scan shift circuit 54 to output the high voltage in the first stage to control the data writing transistor M2 to turn off in the first stage.

In some embodiments, in the first stage, the display driving chip 200 may provide the reference voltage VCI of the display driving chip 200 to the data line DATA, and other voltages provided by the display driving chip may be converted from the reference voltage VCI. In the first stage, the reference voltage VCI may be directly provided to the data line, Therefore, the conversion process may be reduced to improve efficiency.

In other embodiments, to improve the flickering problem caused by the leakage of the data writing transistor in the first stage, the display driving chip 200 may provide the black state voltage VGMP to the data line DATA in the first stage.

In some embodiments, as shown in FIG. 2, the light-emitting control transistors M1/M6, the driving transistor M3 and the light-emitting element 30 are connected in series between the first power line PVDD and the second power line PVEE.

In the first stage, the display driving chip may not provide power supply voltage to the first power line PVDD and the second power line PVEE. In the display stage, the display driving chip may provide power supply voltage to the first power line PVDD and the second power line PVEE. During the display stage, the display driving chip may provide positive voltage to the first power line PVDD and negative voltage to the second power line PVEE.

And/or, as shown in FIG. 2, the initialization transistor M7 may be electrically connected between the initialization signal line VREF2 and the first electrode of the light-emitting element 30. In the first stage, the display driving chip may not provide the initialization voltage to the initialization signal line VREF2. In the display stage, the display driving chip may provide the initialization signal line VREF2 with the initialization voltage. During the display stage, the display driving chip may provide negative voltage to the initialization signal line VREF2.

The first power line PVDD, the second power line PVEE, and the initialization signal line VREF2 may have low potential GND in the first stage, and the first power line PVDD, the second power line PVEE, and the initialization signal line VREF2 may start to provide power normally during the display stage.

The situation corresponding to timing shown in FIG. 4 may include: in the first stage, the P-type light-emitting control transistors M1 and M6 may be turned off, the P-type bias transistor M8 may be turned on, the N-type threshold compensation transistor M5 may be turned on, and the N-type reset transistor M4 may be turned off, the P-type data writing transistor M2 may be turned off, and the bias signal line DVH may provide the first voltage V1 to the driving transistor M3.

The situation corresponding to timing shown in FIG. 11 may include: in the first stage, the P-type light-emitting control transistors M1 and M6 are turned off, the P-type bias transistor M8 is turned on, the P-type threshold compensation transistor M5 is turned on, the P-type reset transistor M4 is turned off, the P-type data writing transistor M2 is turned off, and the bias signal line DVH provides the first voltage V1 to the driving transistor M3.

The situation corresponding to timing shown in FIG. 15 may include: in the first stage, the P-type light-emitting control transistors M1 and M6 are turned off, the N-type threshold compensation transistor M5 is turned off, the N-type reset transistor M4 is turned on, the P-type data writing transistor M2 is turned off, and the reset signal line VREF1 provides the first voltage V1 to the driving transistor M3.

The situation corresponding to timing shown in FIG. 16 may include: in the first stage, the P-type light-emitting control transistors M1 and M6 are turned off, the P-type threshold compensation transistor M5 is turned off, the P-type reset transistor M4 is turned on, the P-type data writing transistor M2 is turned off, and the reset signal line VREF1 provides the first voltage V1 to the driving transistor M3.

The present disclosure also provides a driving method of a display device.

As shown in FIG. 1, the display device may include a display panel 100. The display panel 100 may include pixel circuits 20 arranged in a plurality of rows. The pixel circuits 20 may be used to drive light-emitting elements 30.

One pixel circuit 20 may include a driving transistor M3, and light-emitting control transistors M1 and M6. The driving transistor M3 may be used to generate a driving current to drive the corresponding light-emitting element 30 to emit light, and the magnitude of the driving current may affect the brightness of the corresponding light-emitting element 30. The light-emitting control transistors M1 and M6 may be used to control the corresponding light-emitting element 30 to enter a light-emitting stage. For example, when the light-emitting control transistors M1 and M6 are turned on, the driving current generated by the driving transistor M3 may be transmitted to the corresponding light-emitting element 30, and the corresponding light-emitting element 30 may emit light.

The driving process of the display panel may include a first stage and a display stage, and the first stages may be located at least before or after the display stage.

Figure 19:
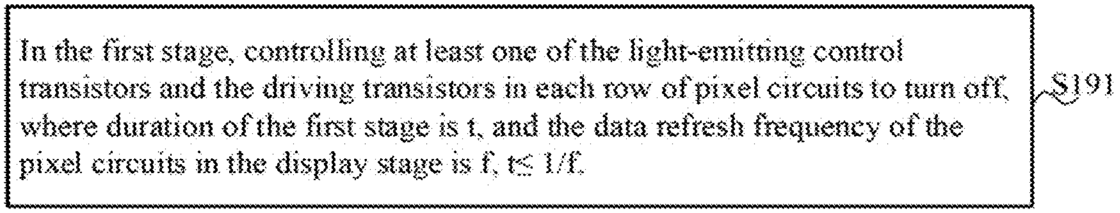
FIG. 19 illustrates a flowchart of an exemplary driving method of a display device consistent with various disclosed embodiments in the present disclosure.

As shown in FIG. 19, in one embodiment, the driving method of the display device may include:

S191, in the first stage, controlling at least one of the light-emitting control transistors and the driving transistors in each row of pixel circuits to turn off.

The duration of the first stage may be t, and the data refresh frequency of the pixel circuits in the display stage may be f, where $t \leq 1/f$.

In the present disclosure, by controlling the duration of the power-on and power-off stages within one refresh frame, the time required for power-on and power-off may be shortened, fast power-on and power-off may be achieved, and the user experience may be improved. Further, in the first stage, the light-emitting control transistors and driving transistors of each row of pixel circuits may be all turned off. Therefore, a double insurance to prevent the light-emitting elements from emitting light may be provided, thereby helping to avoid the flash screen of the display device during the power-on and power-off stages.

In some embodiments, the display panel may further include a plurality of cascaded emission shift circuits. The plurality of emission shift circuits may be electrically connected to the gates of the emission control transistors through the emission control signal lines. The plurality of emission shift circuits may include a first emission shift circuit, and the first emission shift circuit may be electrically connected to the emission start signal line.

The first emission shift circuit may include a first input transistor, a first setting transistor, and a first output transistor. The first input transistor may be electrically connected between the emission start signal line and the gate of the first output transistor, the first electrode of the first output transistor may be electrically connected to the first potential signal line, and the second electrode of the first output transistor may be electrically connected to the light-emitting control signal line.

The gate of the first setting transistor may be electrically connected to the first control signal line, the first electrode of the first setting transistor may be electrically connected to the second potential signal line, and the second electrode of the first setting transistor may be electrically connected to the gate of the first output transistor.

The first potential signal line may be used to provide an enabling voltage of the light-emitting control transistors, and the second potential signal line may be used to provide a disabling voltage of the light-emitting control transistors.

The display device may further include a display driving chip.

The driving method may include: in the first stage, the display driving chip provides the disabling voltage of the first output transistor to the emission start signal line connected to it, and provides the enabling voltage of the first setting transistor to the first control signal line.

In some embodiments, the light-emitting control transistors and the driving transistors may be electrically connected between the first power line and the first electrode of the light-emitting element.

The driving method may include: in the first stage, a first voltage is written to the gates of the driving transistors in each row of pixel circuits. The first voltage may be larger than or equal to the voltage of the first power line during the display stage.

In some embodiments, the first voltage may be smaller than or equal to the black state voltage.

In some embodiments, the pixel circuit may further include a bias transistor and a threshold compensation transistor. The first electrode of the bias transistor may be electrically connected to the bias signal line, and the second electrode of the bias transistor may be electrically connected to the first electrode of the driving transistor. The first electrode of the threshold compensation transistor may be electrically connected to the second electrode of the driving transistor, and the second electrode of the threshold compensation transistor may be electrically connected to the gate of the driving transistor.

In the first stage, the bias transistors and the threshold compensation transistors in each row of pixel circuits may all be turned on.

The display device may further include a display driving chip.

The driving method may further include: the display driving chip provides a first voltage to the bias signal line.

In some embodiments, the display panel may also include a plurality of cascaded first scan shift circuits. The first scan shift circuits may be electrically connected to the gate of the bias transistors through the first scan lines. The first scan shift circuits may include a first A scan shift circuit. The first A scan shift circuit may be electrically connected to the first A scan start signal line.

The first A scan shift circuit includes a second A input transistor and a second A output transistor. The second A input transistor may be electrically connected between the first A scan shift circuit and the gate of the second A output transistor. The first electrode of the second A output transistor may be electrically connected to the first A potential signal line, and the second electrode of the second A output transistor may be electrically connected to the first scan line.

The first A potential signal line may be used to provide an disabling voltage of the bias transistor.

The display device may further include a display driving chip.

The driving method may include: in the first stage, the display driving chip provides the disabling voltage of the second A output transistor to the first A scan start signal line.

In some embodiments, the first A scan shift circuit may also include a second A setting transistor. The gate of the second A setting transistor may be electrically connected to the second A control signal line. The first electrode of the second A setting transistor may be electrically connected to the second A potential signal line, and the second electrode of the second A setting transistor may be electrically connected to the gate of the second A output transistor.

The second A potential signal line may be used to provide the disabling voltage for the bias transistor.

The driving method may include: in the first stage, the display driving chip provides the disabling voltage of the second A setting transistor to the second A control signal line.

In some embodiments, the threshold compensation transistor may be an N-type transistor.

The display panel may further include a plurality of cascaded second scan shift circuits, and the second scan shift circuits may be electrically connected to the gates of the threshold compensation transistors through the second scan lines. The second scan shift circuits may include a second B scan shift circuit. The second B scan shift circuit may be electrically connected to the second B scan start signal line.

The second B scan shift circuit may include a second B input transistor, a second B setting transistor, and a second B output transistor. The second B input transistor may be electrically connected between the second B scan start signal line and the gate of the second B output transistor. The first electrode of the second B output transistor may be electrically connected to the second scan line, and the second electrode of the second B output transistor may be electrically connected to the second scan line.

The gate of the second B setting transistor may be electrically connected to the second B control signal line, the first electrode of the second B setting transistor may be electrically connected to the second B potential signal line, and the second electrode of the second B setting transistor may be electrically connected to the gate of the second B output transistor.

The first B potential signal line may be used to provide the disabling voltage to the threshold compensation transistor, and the second B potential signal line may be used to provide the enabling voltage of the threshold compensation transistor.

The display device may also include a display driving chip.

The driving method may include: in the first stage, the display driving chip provides the disabling voltage of the second B output transistor to the second B scan start signal line, and provides the enabling voltage of the second B setting transistor to the second B control signal line.

In some other embodiments, the threshold compensation transistor may be a P-type transistor.

The display panel may further include a plurality of cascaded second scan shift circuits, and the second scan shift circuits may be electrically connected to the gates of the threshold compensation transistors through the second scan lines. The second scan shift circuits may include a second B scan shift circuit. The second B scan shift circuit may be electrically connected to the second B scan start signal line.

The second B scan shift circuit may include a second B input transistor and a second B output transistor. The second B input transistor may be electrically connected between the second B scan start signal line and the gate of the second B output transistor. The first electrode of the second B output transistor may be electrically connected to the first B potential signal line, and the second electrode of the second B output transistor may be electrically connected to the second scan line.

The first B potential signal line may be used to provide the enabling voltage of the threshold compensation transistor.

The display device may also include a display driving chip.

The driving method may include: in the first stage, the display driving chip provides the enabling voltage of the second B output transistor to the second B scan start signal line.

In some embodiments, the pixel circuit may also include a reset transistor, and the reset transistor may be electrically connected between the gate of the driving transistor and the reset signal line.

The driving method may include: in the first stage, controlling the reset transistors of each row of pixel circuits to be turned off.

In some embodiments, the driving method may include: in the first stage, the display driving chip does not provide the reset voltage to the reset signal line, and in the display stage, the display driving chip provides the reset voltage to the reset signal line.

In some embodiments, the pixel circuit may also include a reset transistor, and the reset transistor may be electrically connected between the gate of the driving transistor and the reset signal line.

In the first stage, the reset transistors in each row of pixel circuits may be all turned on.

The display device may also include a display driving chip.

The driving method may include: in the first stage, the display driving chip provides a first voltage to the reset signal line.

In some embodiments, the reset transistor may be an N-type transistor.

The display panel may further include a plurality of cascaded third scan shift circuits, and the third scan shift circuits may be electrically connected to the gates of the reset transistors through third scan lines. The third scan shift circuits may include a third C scan shift circuit, and the third C scan shift circuit may be electrically connected to the third C scan start signal line.

The third C scan shift circuit may include a third C input transistor, a third C setting transistor, and a third C output transistor. The third C input transistor may be electrically connected between the third C scan start signal line and the gate of the third C output transistor. The first electrode of the third C output transistor may be electrically connected to the first C potential signal line, and the second electrode of the third C output transistor may be electrically connected to the third scan line.

The gate electrode of the third C setting transistor may be electrically connected to the third C control signal line, the first electrode of the third C setting transistor may be electrically connected to the second C potential signal line, and the second electrode of the third C setting transistor may be electrically connected to the gate of the third C output transistor.

The first C potential signal line may be used to provide the disabling voltage of the reset transistor, and the second C potential signal line may be used to provide the disabling voltage of the reset transistor.

The display device may also include a display driving chip.

The driving method may include: in the first stage, the display driving chip provides the disabling voltage of the third C output transistor to the third C scan start signal line, and provides the disabling voltage of the third C setting transistor to the third C control signal line.

In some other embodiments, the reset transistor may be a P-type transistor.

The display panel may further include a plurality of cascaded third scan shift circuits, and the third scan shift circuits may be electrically connected to the gates of the reset transistors through third scan lines. The third scan shift circuits may include a third C scan shift circuit, and the third C scan shift circuit may be electrically connected to the third C scan start signal line.

The third C scan shift circuit may include a third C input transistor and a third C output transistor. The third C input transistor may be electrically connected between the third C scan start signal line and the gate of the third C output transistor. The first electrode of the third C output transistor may be electrically connected to the first C potential signal line, and the second electrode of the third C output transistor may be electrically connected to the third scan line.

The first C potential signal line may be used to provide the disabling voltage of the reset transistor.

The display device may also include a display driving chip.

The driving method may include: in the first stage, the display driving chip provides the enabling voltage of the third C output transistor to the third C scan start signal line.

In some embodiments, the pixel circuit may also include a threshold compensation transistor. The first electrode of the threshold compensation transistor may be electrically connected to the second electrode of the driving transistor, the second electrode of the threshold compensation transistor may be electrically connected to the gate electrode of the driving transistor, and the gate electrode of the threshold compensation transistor may be electrically connected to the third scan shift circuit.

In some embodiment, in the first stage, the threshold compensation transistors in each row of pixel drive circuits may be turned off.

In some embodiments, the pixel circuit may further include a data writing transistor, and the data writing transistor may be electrically connected between the first electrode of the driving transistor and the data line.

The display panel may further include a plurality of cascaded fourth scan shift circuits. The fourth scan shift circuits may be electrically connected to the gates of the data writing transistors through the fourth scan lines. The fourth scan shift circuits may include a fourth D scan shift circuit. The fourth D scan shift circuit may be electrically connected to the fourth D scan start signal line.

The fourth D scan shift circuit may include a fourth D input transistor and a fourth D output transistor. The fourth input transistor may be electrically connected between the fourth scan start signal line and the gate of the fourth output transistor. The first electrode of the fourth D output transistor may be electrically connected to the clock signal line, and the second electrode of the fourth D output transistor may be electrically connected to the fourth scan line.

The clock signal line may be used to alternately provide the enabling voltage and the disabling voltage to the data writing transistor.

The display device may also include a display driving chip.

The driving method may include: in the first stage, the display driving chip provides the disabling voltage of the fourth D output transistor to the fourth D scan start signal line.

In some embodiments, the driving method may include: in the first stage, the display driving chip provides the reference voltage of the display driving chip to the data line.

In some embodiments, the light-emitting control transistors, the driving transistor and the light-emitting element may be connected in series between the first power line and the second power line.

The display device may further include a display driving chip.

The driving method may include: in the first stage, the display driving chip does not provide power voltage to the first power line and the second power line; and, in the display stage, the display driving chip provides power voltage to the first power line and the second power line.

In some embodiments, the pixel circuit may also include an initialization transistor. The initialization transistor may be electrically connected between the initialization signal line and the first electrode of the light-emitting element. In the first stage, the display driving chip may not provide the initialization voltage to the initialization signal line. In the display stage, the display driving chip may provide the initialization voltage to the initialization signal line.

In some embodiments, the pixel circuit may have multiple data refresh frequencies during the display stage, and f may be the maximum value among the multiple data refresh frequencies.

In various embodiments, the display device may be, but is not limited to, a cell phone, a wearable device, a computer, a television, a vehicle display device, or another device with a display function, which is not limited in the present disclosure.

In this document, relational terms such as "first" and "second" are only used to distinguish one entity or operation from another entity or operation and do not necessarily require or imply that there is a relationship between these entities or operations. There is no such actual relationship or sequence. Furthermore, the terms "comprises," "comprises," or any other variations thereof are intended to cover a non-exclusive inclusion such that a process, method, article, or apparatus that includes a list of elements includes not only those elements, but also those not expressly listed other elements, or elements inherent to the process, method, article or equipment. Without further limitation, an element defined by the statement "comprises a . . . " does not exclude the presence of additional identical elements in a process, method, article, or apparatus that includes the stated element.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display device, comprising a display panel, wherein the display panel includes pixel circuits arranged in multiple rows;

each pixel circuit includes a light-emitting control transistor and a driving transistor; wherein: the light-emitting control transistor is used to control a corresponding light-emitting element to enter a light-emitting stage; and the driving transistor is used to provide a driving current for the corresponding light-emitting element;

the light-emitting control transistor and the driving transistor are electrically connected between a first power line and a first electrode of a corresponding light-emitting element, and the light-emitting control transistor, the driving transistor, and the light-emitting element are connected in series between the first power line and a second power line;

a driving process of the display panel includes a first stage and a display stage, wherein the first stage is located immediately before or immediately after the display stage;

in the first stage, at least one of light-emitting control transistors and driving transistors in each row of pixel circuits is turned off;

a duration of the first stage is t, and a data refresh frequency of the pixel circuits in the display stage is f, $t \leq 1/f$, wherein the $1/f$ is a duration of a refresh frame or display frame; and in the first stage, no power voltage is provided to the first power line and the second power line, and in the display stage, power voltage is provided to the first power line and the second power line.

2. The display device according to claim 1, wherein:

the display panel further includes a plurality of emission shift circuits in cascade;

one emission shift circuit is electrically connected to a gate of one corresponding light-emitting control transistor through a light-emitting control signal line;

the plurality of emission shift circuits includes a first emission shift circuit;

the first emission shift circuit is electrically connected to an emission start signal line;

the first emission shift circuit includes a first input transistor, a first setting transistor and a first output transistor;

the first input transistor is electrically connected between the emission start signal line and a gate of the first output transistor;

a first electrode of the first output transistor is electrically connected to a first potential signal line, and a second electrode of the first output transistor is electrically connected to the light-emitting control signal line;

a gate of the first setting transistor is electrically connected to a first control signal line, a first electrode of the first setting transistor is electrically connected to a second potential signal line, and a second electrode of the first setting transistor is electrically connected to the gate of the first output transistor;

the first potential signal line is used to provide an enabling voltage of the light-emitting control transistor, and the second potential signal line is used to provide a disabling voltage of the light-emitting control transistor;

the display device also includes a display driving chip; and in the first stage, the display driving chip provides the disabling voltage of the first output transistor to the emission start signal line connected to the display driving chip, and provides the enabling voltage of the first setting transistor to the first control signal line.

3. The display device according to claim 1, wherein:

in the first stage, gates of driving transistors in each row of pixel circuits are written with a first voltage, wherein the first voltage is larger than or equal to a voltage of the first power line during the display stage.

4. The display device according to claim 3, wherein:

the first voltage is smaller than or equal to a black state voltage.

5. The display device according to claim 3, wherein:

the pixel circuit further includes a bias transistor and a threshold compensation transistor;

a first electrode of the bias transistor is electrically connected to a bias signal line, and a second electrode of the bias transistor is electrically connected to a first electrode of the driving transistor;

a first electrode of the threshold compensation transistor is electrically connected to the second electrode of the driving transistor, and a second electrode of the threshold compensation transistor is electrically connected to a gate electrode of the driving transistor;

in the first stage, bias transistors and threshold compensation transistors in each row of pixel circuits are all turned on;

the display device further includes a display driving chip; and in the first stage, the display driving chip provides the bias signal line with the first voltage.

6. The display device according to claim 5, wherein:

the display panel further includes a plurality of first scan shift circuits in cascade;

one first scan shift circuit is electrically connected to a gate of one corresponding bias transistor through a first scan line;

the plurality of first scan shift circuits includes a first A scan shift circuit;

the first A scan shift circuit is electrically connected to a first A scan start signal line;

the first A scan shift circuit includes a second A input transistor and a second A output transistor;

the second A input transistor is electrically connected between the first A scan start signal line and a gate of the second A output transistor;

a first electrode of the second A output transistor is electrically connected to a first A potential signal line, and a second electrode of the second A output transistor is electrically connected to the first scan line;

the first A potential signal line is used to provide an enabling voltage of the bias transistor;

the display device further includes a display driving chip; and in the first stage, the display driving chip provides an enabling voltage of the second A output transistor to the first A scan start signal line.

7. The display device according to claim 6, wherein:

the first A scan shift circuit further includes a second A setting transistor;

a gate of the second A setting transistor is electrically connected to a second A control signal line, a first electrode of the second A setting transistor is electrically connected to a second A potential signal line, and a second electrode of the second A setting transistor is electrically connected to the gate of the second A output transistor;

the second A potential signal line is used to provide the disabling voltage of the bias transistor; and in the first stage, the display driving chip provides a disabling voltage of the second A setting transistor to the second A control signal line.

8. The display device according to claim 5, wherein:

the threshold compensation transistor is an N-type transistor;

the display panel further includes a plurality of second scan shift circuits in cascade, wherein one second scan shift circuit is electrically connected to a gate of one corresponding threshold compensation transistor through a second scan line;

the plurality of second scan shift circuits includes a second B scan shift circuit;

the second B scan shift circuit is electrically connected to a second B scan start signal line;

the second B scan shift circuit includes a second B input transistor, a second B setting transistor and a second B output transistor;

the second B input transistor is electrically connected between the second B scan start signal line and a gate of the second B output transistor;

a first electrode of the second B output transistor is electrically connected to a first B potential signal line, and a second electrode of the second B output transistor is electrically connected to the second scan line;

a gate of the second B setting transistor is electrically connected to a second B control signal line, a first electrode of the second B setting transistor is electrically connected to a second B potential signal line, and a second electrode of the second B setting transistor is electrically connected to the gate of the second B output transistor;

the first B potential signal line is used to provide a disabling voltage of the threshold compensation transistor, and the second B potential signal line is used to provide an enabling voltage of the threshold compensation transistor;

the display device further includes a display driving chip; and in the first stage, the display driving chip provides the disabling voltage of the second B output transistor to the second B scan start signal line, and provides the enabling voltage of the second B setting transistor to the second B control signal line.

9. The display device according to claim 5, wherein:

the threshold compensation transistor is a P-type transistor;

the display panel further includes a plurality of second scan shift circuits in cascade, wherein one second scan shift circuit is electrically connected to a gate of one corresponding threshold compensation transistor through a second scan line;

the plurality of second scan shift circuits includes a second B scan shift circuit;

the second B scan shift circuit is electrically connected to a second B scan start signal line;

the second B scan shift circuit includes a second B input transistor and a second B output transistor;

the second B input transistor is electrically connected between the second B scan start signal line and a gate of the second B output transistor;

a first electrode of the second B output transistor is electrically connected to a first B potential signal line, and a second electrode of the second B output transistor is electrically connected to the second scan line;

the first B potential signal line is used to provide an enabling voltage of the threshold compensation transistor;

the display device further includes a display driving chip; and in the first stage, the display driving chip provides the enabling voltage of the second B output transistor to the second B scan start signal line.

10. The display device according to claim 5, wherein:

the pixel circuit also includes a reset transistor electrically connected between the gate of the driving transistor and a reset signal line; and in the first stage, reset transistors of each row of pixel circuits are all turned off.

11. The display device according to claim 10, wherein:

in the first stage, the display driving chip does not provide a reset voltage to the reset signal line; and in the display stage, the display driving chip provides the reset voltage to the reset signal line.

12. The display device according to claim 3, wherein:

the pixel circuit also includes a reset transistor electrically connected between the gate of the driving transistor and a reset signal line; and in the first stage, reset transistors of each row of pixel circuits are all turned on;

the display device further includes a display driving chip; and in the first stage, the display driving chip provides the first voltage to the reset signal line.

13. The display device according to claim 12, wherein:

the reset transistor is an N-type transistor;

the display panel further includes a plurality of third scan shift circuits in cascade, wherein one third scan shift circuit is electrically connected to a gate of one corresponding reset transistor through a third scan line;

the plurality of third scan shift circuits includes a third C scan shift circuit, and the third C scan shift circuit is electrically connected to a third C scan start signal line;

the third C scan shift circuit includes a third C input transistor, a third C setting transistor and a third C output transistor;

the third C input transistor is electrically connected between the third C scan start signal line and a gate of the third C output transistor;

a first electrode of the third C output transistor is electrically connected to a first C potential signal line, and a second electrode of the third C output transistor is electrically connected to the third scan line;

a gate of the third C setting transistor is electrically connected to a third C control signal line, a first electrode of the third C setting transistor is electrically connected to a second C potential signal line, and a second electrode of the third C setting transistor is electrically connected to the gate of the third C output transistor;

the first C potential signal line is used to provide the disabling voltage of the reset transistor, and the second C potential signal line is used to provide the enabling voltage of the reset transistor;

the display device further includes a display driving chip; and in the first stage, the display driving chip provides the disabling voltage of the third C output transistor to the third C scan start signal line, and provides the enabling voltage of the third C setting transistor to the third C control signal line.

14. The display device according to claim 12, wherein:

the reset transistor is a P-type transistor;

the display panel further includes a plurality of third scan shift circuits in cascade, wherein one third scan shift circuit is electrically connected to a gate of one corresponding reset transistor through a third scan line;

the plurality of third scan shift circuits includes a third C scan shift circuit, wherein the third C scan shift circuit is electrically connected to a third C scan start signal line;

the third C scan shift circuit includes a third C input transistor and a third C output transistor;

the third C input transistor is electrically connected between the third C scan start signal line and a gate of the third C output transistor;

a first electrode of the third C output transistor is electrically connected to a first C potential signal line, and a second electrode of the third C output transistor is electrically connected to the third scan line;

the first C potential signal line is used to provide the enabling voltage of the reset transistor;

the display device further includes a display driving chip; and in the first stage, the display driving chip provides the enabling voltage of the third C output transistor to the third C scan start signal line.

15. The display device according to claim 12, wherein:

the pixel circuit further includes a threshold compensation transistor, wherein a first electrode of the threshold compensation transistor is electrically connected to the second electrode of the driving transistor and a second electrode of the threshold compensation transistor is electrically connected to the gate of the driving transistor; and threshold compensation transistors and reset transistors of different rows share the same third scan shift circuits; or, in the first stage, threshold compensation transistors of each row are all turned off.

16. The display device according to claim 1, wherein:

the pixel circuit further includes a data writing transistor electrically connected between the first electrode of the driving transistor and a data line;

the display panel further includes a plurality of fourth scan shift circuits in cascade, wherein one fourth scan shift circuit is electrically connected to a gate of one corresponding data writing transistor through a fourth scan line;

the plurality of fourth scan shift circuits includes a fourth D scan shift circuit, wherein the fourth D scan shift circuit is electrically connected to a fourth D scan start signal line;

the fourth D scan shift circuit includes a fourth D input transistor and a fourth D output transistor;

the fourth D input transistor is electrically connected between the fourth D scan start signal line and a gate of the fourth D output transistor;

a first electrode of the fourth D output transistor is electrically connected to a clock signal line, and a second electrode of the fourth D output transistor is electrically connected to the fourth scan line;

the clock signal line is used to alternately provide an enabling voltage and a disabling voltage of the data writing transistor;

the display device further includes a display driving chip; and in the first stage, the display driving chip provides the disabling voltage of the fourth D output transistor to the fourth D scan start signal line.

17. The display device according to claim 1, wherein:

in the first stage, a reference voltage of a display driving chip is provided to a data line connected to the pixel circuit.

18. The display device according to claim 1, wherein:

the light-emitting control transistor, the driving transistor and the light-emitting element are connected in series between a first power line and a second power line;

the display device further includes a display driving chip;

in the first stage, the display driving chip does not provide a power voltage to the first power line and the second power line;

in the display stage, the display driving chip provides the power voltage to the first power line and the second power line;

the pixel circuit further includes an initialization transistor electrically connected between an initialization signal line and the first electrode of the light-emitting element;

in the first stage, the display driving chip does not provide an initialization voltage to the initialization signal line; and in the display stage, the display driving chip provides the initialization voltage to the initialization signal line.

19. The display device according to claim 1, wherein:

the pixel circuits have a plurality of data refresh frequencies during the display stage, and f is a maximum value among the plurality of data refresh frequencies.

* * * * *